US010992980B2

(12) United States Patent
Kim et al.

(10) Patent No.: US 10,992,980 B2
(45) Date of Patent: *Apr. 27, 2021

(54) USER TERMINAL APPARATUS, ELECTRONIC APPARATUS, SYSTEM, AND CONTROL METHOD THEREOF

(71) Applicant: SAMSUNG ELECTRONICS CO., LTD., Suwon-si (KR)

(72) Inventors: In-ji Kim, Uijeongbu-si (KR); Sang-on Choi, Suwon-si (KR); Byung-seok Soh, Yongin-si (KR); Mi-ra Yu, Seoul (KR); Ho-june Yoo, Seoul (KR); Eun-seok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,384

(22) Filed: May 10, 2019

(65) Prior Publication Data
US 2019/0268648 A1 Aug. 29, 2019

Related U.S. Application Data

(63) Continuation of application No. 15/282,334, filed on Sep. 30, 2016, which is a continuation of application (Continued)

(30) Foreign Application Priority Data

Mar. 21, 2014 (KR) ........................ 10-2014-0033410
Sep. 11, 2014 (KR) ........................ 10-2014-0120276

(51) Int. Cl.
H04N 21/422 (2011.01)
H04N 21/4415 (2011.01)
(Continued)

(52) U.S. Cl.
CPC ....... *H04N 21/422* (2013.01); *G06F 3/03547* (2013.01); *G06F 3/04883* (2013.01);
(Continued)

(58) Field of Classification Search
None
See application file for complete search history.

(56) References Cited

U.S. PATENT DOCUMENTS 6,636,973 B1   10/2003  Novoa et al.
2003/0172283 A1  9/2003  O'Hara
(Continued)

FOREIGN PATENT DOCUMENTS

CN   102487289 A   6/2012
CN   103607599 A   2/2014
(Continued)

OTHER PUBLICATIONS

International Search Report dated Jun. 3, 2015 issued by International Searching Authority in counterpart International Application No. PCT/KR2015/002574 (PCT/ISA/210).
(Continued)

*Primary Examiner* — John F Mortell
(74) *Attorney, Agent, or Firm* — Sughrue Mion, PLLC

(57) ABSTRACT

A user terminal apparatus is provided. The user terminal apparatus for performing a remote control function for an electronic apparatus includes a communication unit configured to communicate with an electronic apparatus for providing a text input user interface (UI), an input unit configured to receive a user command for input of a specific text on the text input UI, a fingerprint scanner provided in the input unit and configured to recognize a user fingerprint, and a controller configured to recognize a user fingerprint according to the user command and to transmit information corresponding to the recognized user fingerprint to the
(Continued)

electronic apparatus in response to the electronic apparatus entering a preset text input mode.

29 Claims, 29 Drawing Sheets

Related U.S. Application Data

No. 15/271,929, filed on Sep. 21, 2016, now abandoned, which is a continuation of application No. PCT/KR2015/002574, filed on Mar. 17, 2015.

(51) Int. Cl.
| | |
|---|---|
| G06F 21/32 | (2013.01) |
| H04N 21/475 | (2011.01) |
| G06F 3/0354 | (2013.01) |
| G06F 3/0488 | (2013.01) |
| G06K 9/00 | (2006.01) |
| G08C 17/02 | (2006.01) |
| H04N 21/45 | (2011.01) |
| H04N 21/4227 | (2011.01) |
| H04N 21/472 | (2011.01) |
| H04W 88/02 | (2009.01) |
| H04N 21/41 | (2011.01) |

(52) U.S. Cl.
CPC ........... *G06F 21/32* (2013.01); *G06K 9/0002* (2013.01); *G08C 17/02* (2013.01); *H04N 21/42204* (2013.01); *H04N 21/42222* (2013.01); *H04N 21/42224* (2013.01); *H04N 21/4415* (2013.01); *H04N 21/4532* (2013.01); *H04N 21/475* (2013.01); *G06F 2203/0338* (2013.01); *G08C 2201/30* (2013.01); *G08C 2201/61* (2013.01); *H04N 21/4126* (2013.01); *H04N 21/4227* (2013.01); *H04N 21/472* (2013.01); *H04W 88/02* (2013.01)

(56) References Cited

U.S. PATENT DOCUMENTS

| | | |
|---|---|---|
| 2005/0204173 A1 | 9/2005 | Chang |
| 2007/0008066 A1 | 1/2007 | Fukuda |
| 2007/0110287 A1 | 5/2007 | Kim et al. |
| 2007/0140533 A1 | 6/2007 | Hsieh et al. |
| 2008/0042983 A1 | 2/2008 | Kim et al. |
| 2010/0077090 A1 | 3/2010 | Cohen |
| 2011/0043326 A1 | 2/2011 | Lee et al. |
| 2011/0102569 A1 | 5/2011 | Erhart |
| 2011/0156867 A1 | 6/2011 | Carrizo et al. |
| 2011/0221622 A1 | 9/2011 | West et al. |
| 2012/0200489 A1* | 8/2012 | Miyashita ......... H04N 21/4782 345/156 |
| 2013/0336545 A1* | 12/2013 | Pritikin ............. G06K 9/00892 382/116 |
| 2014/0003679 A1 | 1/2014 | Han et al. |
| 2015/0019873 A1 | 1/2015 | Hagemann |
| 2015/0067080 A1 | 3/2015 | Cho et al. |

FOREIGN PATENT DOCUMENTS

| | | |
|---|---|---|
| EP | 2226741 A1 | 9/2010 |
| GB | 2388941 A | 11/2003 |
| KR | 20-0253741 Y1 | 12/2001 |
| KR | 2001-0111609 A | 12/2001 |
| KR | 10-1127286 B1 | 3/2012 |
| KR | 10-2012-0053296 | 5/2012 |
| KR | 10-1161544 | 7/2012 |
| KR | 10-2013-0014983 A | 2/2013 |
| KR | 10-1297166 B1 | 8/2013 |
| KR | 10-2013-0103050 A | 9/2013 |
| WO | 2004/055717 A1 | 7/2004 |
| WO | 2013/049190 | 4/2013 |

OTHER PUBLICATIONS

Written Opinion dated Jun. 3, 2015 issued by International Searching Authority in counterpart International Application No. PCT/KR2015/002574 (PCT/ISA/237).
Communication dated Apr. 26, 2017, issued by the European Patent Office in counterpart European Application No. 15765143.1.
Communication dated Jul. 5, 2018, issued by the State Intellectual Property Office of People's Republic of China in counterpart Chinese Application No. 201580013059.7.
Communication dated Jan. 24, 2019, issued by the State Intellectual Property Office of People's Republic of China in counterpart Chinese Application No. 201580013059.7.
European Patent Office, Communication dated May 8, 2019 in copending Application No. 15 765 143.1.
Communication dated Sep. 30, 2019, issued by the State Intellectual Property Office of P.R. China in counterpart Chinese Application No. 201580013059.7.
Communication dated Mar. 6, 2020 issued by the European Patent Office in counterpart European Application No. 15765143.1.
European Patent Office, Communication dated Oct. 5, 2020, in copending European Application No. 15765143.1.
European Patent Office, Communication dated Oct. 21, 2020, in copending European Application No. 15765143.1.
Communication dated Dec. 24, 2020 issued by the Korean Intellectual Property Office in Korean Application No. 10-2014-0120276.
Communication dated Mar. 12, 2021 issued by the European Patent Office in European Application No. 20215388.8.

\* cited by examiner

USER TERMINAL APPARATUS, ELECTRONIC APPARATUS, SYSTEM, AND CONTROL METHOD THEREOF

CROSS-REFERENCE TO RELATED APPLICATIONS

This application is a continuation application of U.S. application Ser. No. 15/282,334 filed on Sep. 30, 2016, which is a continuation application of U.S. application Ser. No. 15/271,929 filed on Sep. 21, 2016, which is continuation application of PCT International Application No. PCT/KR2015/002574 filed on Mar. 17, 2015, which claims priority from Korean Patent Application No. 10-2014-0033410 filed on Mar. 21, 2014, and Korean Patent Application No. 10-2014-0120276, filed on Sep. 11, 2014, the disclosures of all of which are incorporated by reference herein in their entireties.

BACKGROUND

Field

Apparatuses and methods consistent with the present invention relate to a user terminal apparatus, an electronic apparatus, a system, and a control method thereof, and more particularly, a user terminal apparatus, an electronic apparatus, a system, and a control method thereof, for communication with an electronic apparatus.

Description of Related Art

A recent electronic apparatus provides various functions and information in response to user's request instead of unilaterally providing a function or information to a user. For example, recently introduced televisions (TVs) provide a user interaction function such as an application executing function, a web browsing searching function, etc. as well as a broadcast receiving function.

As the width of services provided by an electronic apparatuses has increased, user authentication has been required to provide a service that needs security, such as a purchase service, a private content providing service, etc.

However, during user authentication using a pattern input or a password, there is worry for the password to be disclosed or it is inconvenient to input a password, the length of which is not short, every authentication.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a user terminal apparatus, an electronic apparatus, a system, and a control method thereof, for allowing easy authentication while ensuring security by simultaneously inputting fingerprint authentication and password authentication.

According to an aspect of the present invention, a user terminal apparatus for performing a remote control function for an electronic apparatus includes a communication unit configured to communicate with an electronic apparatus for providing a character input user interface (UI), an input unit configured to receive a user command for input of a specific text on the character input UI, a fingerprint scanner provided in the input unit and configured to recognize a user fingerprint, and a controller configured to recognize a user fingerprint according to the user command and to transmit information corresponding to the recognized user fingerprint to the electronic apparatus in response to the electronic apparatus entering a preset character input mode.

The preset character input mode may be a character input mode for generation of a user account.

The controller may recognize a user fingerprint according to a user command for input of ID and PASSWORD in a character input mode for generation of the user account.

The user scanner may be provided in a confirmation button area that receives a user command for input of a specific text on the character input UI.

The controller may recognize a user fingerprint by as much as a pressing and manipulating number of times of the confirmation button area and transmit a plurality of pieces of fingerprint information corresponding to the recognized user fingerprint to the electronic apparatus.

The controller may activate the fingerprint scanner in response to the electronic apparatus entering the preset character input mode, and deactivate the fingerprint scanner in response to the electronic apparatus getting out of the preset character input mode.

The controller may determine whether the electronic apparatus enters the preset character input mode based on a signal received from the electronic apparatus.

According to an aspect of the present invention, an electronic apparatus includes a display unit configured to display a character input user interface (UI), a communication unit configured to communicate with a user terminal apparatus and to receive a user command for input of a specific text on the character input UI, and a controller configured to store information corresponding to a user fingerprint recognized based on the user command as authentication information associated with a preset character input mode in response to the information corresponding to the user fingerprint being received from the user terminal apparatus in the preset character input mode.

The information corresponding to the user fingerprint may be received together with the user command for input of a specific text on the character input UI.

The preset character input mode may be a character input mode for generation of a user account, and the controller may store the information corresponding to the user fingerprint received from the user terminal apparatus as authentication information about the user account generated in the character input mode for generation of the user account.

The controller may store the information corresponding to the user fingerprint received from the user terminal apparatus as the authentication information about the user account and then perform authentication based on the stored information in response to an authentication event about the user account occurring.

The information corresponding to the user fingerprint may be generated based on information recognized through a fingerprint scan sensor included in a preset button area that receives the user command from the user terminal apparatus.

The controller may transmit a corresponding signal to the user terminal apparatus and control the fingerprint scan sensor included in the preset button area to be activated in response to the electronic apparatus entering the preset character input mode.

According to an aspect of the present invention, a method of controlling a user terminal apparatus for performing a remote control function for an electronic apparatus includes recognizing a user fingerprint according to a user command for input of a specific text on a character input user interface (UI) in response to the electronic apparatus entering a preset character input mode, and transmitting information corresponding to the recognized user fingerprint to the electronic apparatus.

The preset character input mode may be a character input mode for generation of a user account.

The recognizing of the user fingerprint may include recognizing the user fingerprint through a fingerprint scan sensor included in a confirmation button area that receives a user command for input of a specific text on the character input UI.

According to an aspect of the present invention, a method of controlling an electronic apparatus includes displaying a character input user interface (UI) in a preset character input mode, receiving information corresponding to a user fingerprint received based on a user command for input of a specific text on the character input UI, from a user terminal apparatus, and storing the information corresponding to the user fingerprint as authentication information associated with the preset character input mode.

The preset character input mode is a character input mode for generation of a user account and the storing the information as the authentication information may include storing information corresponding to the user fingerprint from the user terminal apparatus as authentication information associated with a user account generated in a character input mode for generation of the user account.

The controller may store the information corresponding to the user fingerprint received from the user terminal apparatus as the authentication information about the user account and then perform authentication based on the stored information in response to an authentication event about the user account occurring.

According to an aspect of the present invention, a system including a user terminal apparatus and an electronic apparatus includes the electronic apparatus configured to display a character input user interface (UI) in a preset text input mode and to store information corresponding to a user fingerprint recognized based on a user command for input of a specific text on the character input UI as authentication information associated with the preset character input mode in response to the information corresponding to the user fingerprint being received from the user terminal apparatus, and the user terminal apparatus configured to recognize a user fingerprint according to a user command for input of a specific text on a character input UI and to transmit information corresponding to the recognized user fingerprint to the electronic apparatus in response to the electronic apparatus entering the preset character input mode.

According to an aspect of the present invention, a user terminal apparatus using a password authentication method includes an input unit including a touch panel, a fingerprint scanner disposed in one area of the touch panel, and a controller configured to perform user authentication based on a password input via a touch method through the touch panel and to perform additional authentication based on fingerprint information acquired during password input using the touch method.

The password authentication method may include at least one of a pattern authentication method and a number authentication method.

The user terminal apparatus may further include a display unit configured to display a guide graphic user interface (GUI) for guidance of the password input, wherein the fingerprint scanner may be disposed in an area in which the guide GUI is displayed.

The password authentication method may be a pattern authentication method, and the controller may acquire user fingerprint information in at least one of a touch point in which the pattern input is begun, a touch point in which a direction is changed during the pattern input, and a touch point in which the pattern input is terminated.

The password authentication method may be a pattern authentication method, and the controller may acquire user fingerprint information based on pattern input for pattern registration in a pattern registration mode for pattern authentication and store the acquired fingerprint information as reference fingerprint information for fingerprint authentication.

The controller may provide a user interface (UI) for guidance of a corresponding fact when the user fingerprint information is not normally acquired in the pattern registration mode. According to another aspect of the present invention, a method of controlling a user terminal apparatus using a password authentication method includes receiving a password for user authentication via a touch method, and performing user authentication based on the received password and performing additional authentication based on fingerprint information acquired during password input using the touch method.

As described above, according to the various embodiments of the present invention, a user fingerprint may be automatically registered and may be used for an authentication procedure without a separate fingerprint scan procedure, thereby improving user convenience.

BRIEF DESCRIPTION OF DRAWINGS

The above and/or other aspects of the present invention will be more apparent by describing certain exemplary embodiments of the present invention with reference to the accompanying drawings, in which.

DETAILED DESCRIPTION

The exemplary embodiments of the present invention will now be described in greater detail with reference to the accompanying drawings.

Figure 1:
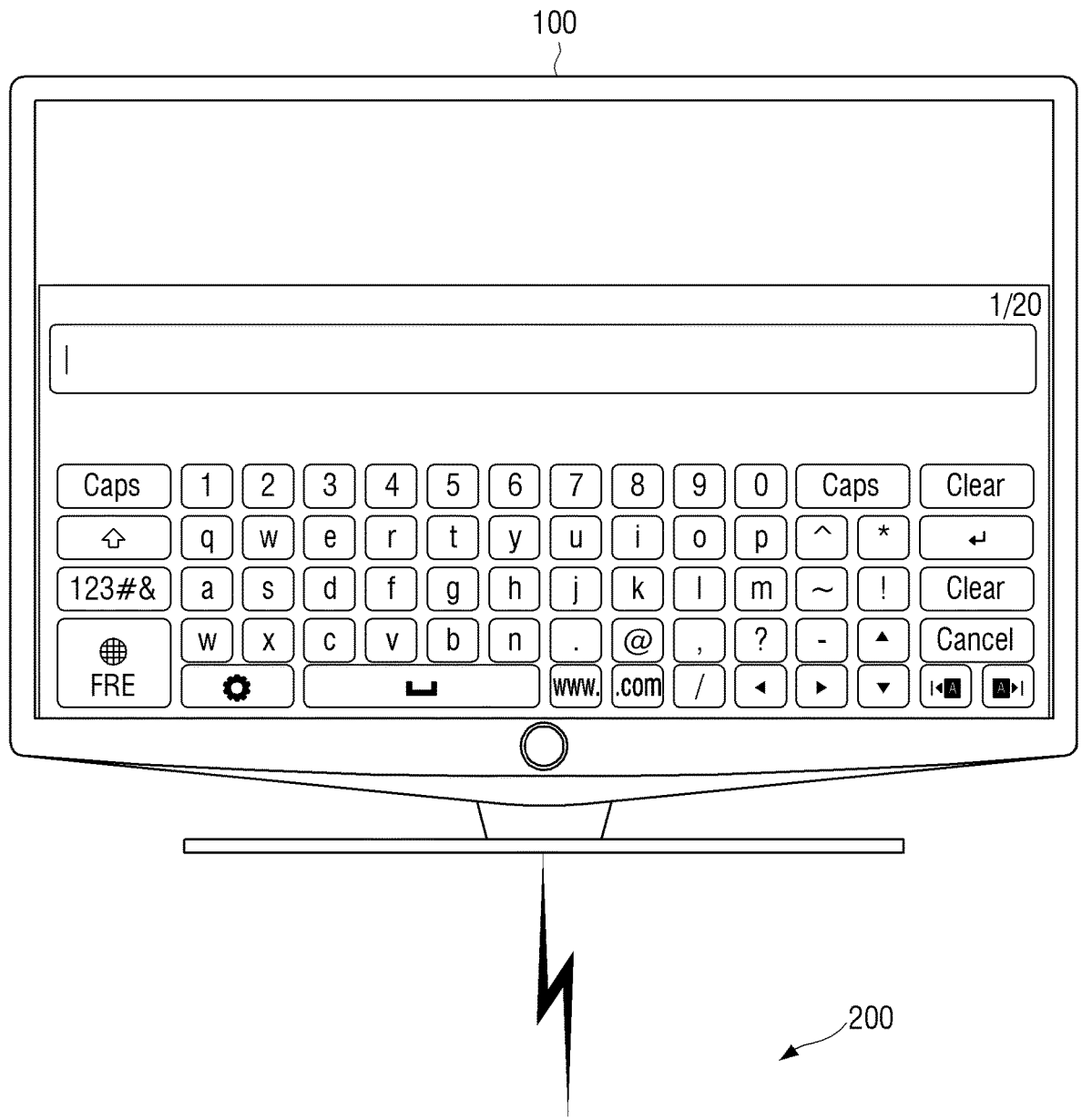
FIG. 1 is a diagram for explanation of an electronic system according to an embodiment of the present invention.

FIG. 1 is a diagram for explanation of an electronic system according to an embodiment of the present invention.

Referring to FIG. 1, the electronic system according to an embodiment of the present invention includes an electronic apparatus 100 and a user terminal apparatus 200.

As illustrated in FIG. 1, the electronic apparatus 100 may be embodied as, but is not limited to, a digital television (TV) and may be embodied as various types of devices with a display function, such as a personal computer (PC), a navigation device, a kiosk, a digital information display (DID), etc. When the electronic apparatus 100 is embodied as a portable device, the electronic apparatus 100 includes a touchscreen installed therein and may be embodied to execute a program using a finger or a pen (e.g., a stylus pen). However, for convenience of description, the case in which the electronic apparatus 100 is embodied as a digital TV will be described.

When the electronic apparatus 100 is embodied as a digital TV, the electronic apparatus 100 may be controlled by the user terminal apparatus 200, voice, or motion. In this case, the user terminal apparatus 200 is used to remotely controlling the electronic apparatus 100 and may be embodied to perform a remote control function of receiving a user command and transmitting a control signal corresponding to the input user command to the electronic apparatus 100. For example, the user terminal apparatus 200 may be embodied as a remote controller, a cellular phone having a remote control function, or the like.

The electronic apparatus 100 may provide various user interface (UI) images according to a user command input through the user terminal apparatus 200. In addition, the electronic apparatus 100 may provide various functions and information according to various types of user interactions for a UI image.

In particular, the electronic apparatus 100 may provide an illustrated character input UI according to various events. Hereinafter, various embodiments of the present invention will be described with reference to a block diagram illustrating a detailed structure of the electronic apparatus 100.

Figure 2A:
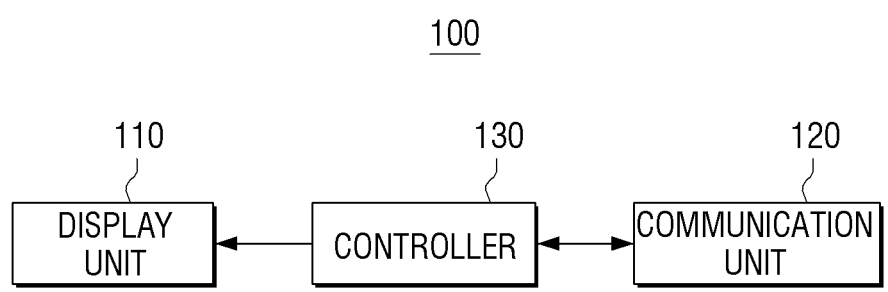
FIG. 2A is a schematic block diagram illustrating a configuration of an electronic apparatus according to an embodiment of the present invention.

FIG. 2A is a schematic block diagram illustrating a configuration of an electronic apparatus 100 according to an embodiment of the present invention.

As illustrated in FIG. 2A, the electronic apparatus 100 includes a display unit 110, a communication unit 120, and a controller 130.

The display unit 110 displays a UI image. Here, the UI image may include various content reproducing images such as an image, a moving picture, a text, music, etc., an application execution image including various contents, a web browser image, a graphic user interface (GUI) image, or the like.

In this case, the display unit 110 may be embodied as, but is not limited to, a liquid crystal display panel (LCD), an organic light emitting diode (OLED), or the like. In addition, the display unit 110 may be embodied as a flexible display, a transparent display, or the like as necessary.

In particular, the display unit 110 may display a character input UI in response to a preset event for text input to the electronic apparatus 100 occurring. Here, the preset event may correspond to the case in which a user command for searching or information input is input in response to a user command for generation (or connection) of a user account being input. The character input UI may be a UI including a plurality of character items and a plurality of function items (e.g., enter, space, etc.) and may be embodied as a virtual keyboard. In addition, in the present invention, a text may be interpreted as a concept including various characters that may be input to a machine and used, such as a language such as Korean, English, Japanese (hiragana and katakana), Chinese character, Chinese, Roman alphabets, Greek alphabets, etc., a symbolic character such as a number, various symbols, etc. or a graphic character, a unit character indicating various units, a rule character, etc.

The communication unit 120 may communicate with various types of external devices or external servers according to various types of communication methods.

In particular, the communication unit 120 communicates with the user terminal apparatus 200 (refer to FIG. 1) to receive various user commands. Here, when the electronic apparatus 100 is embodied as a digital TV, the communication unit 120 may be embodied as a remote control receiver for receiving a remote control signal from the user terminal apparatus 200. Here, the remote control receiver may perform communication according to various communication methods such as WiFi communication, Bluetooth communication, infrared communication, etc.

In response to a character input UI including a plurality of character items being displayed, the communication unit 120 may receive a user command for selection of one of a plurality of character items from the user terminal apparatus 200.

In response to a character input UI being displayed according to an event for generation of a user account, the communication unit 120 may receive a user command for selection one of a plurality of character items included in the corresponding character input UI and information about a user fingerprint recognized based on the corresponding user command, which will be described below in detail The controller 130 controls an overall operation of the electronic apparatus 100.

In particular, upon receiving information corresponding to a user fingerprint recognized based on a user command for character input from the user terminal apparatus 200 in a preset character input mode, the controller 130 may store information corresponding to the user fingerprint as authentication information associated with the corresponding preset character input mode.

Here, the preset character input mode may be a character input mode provided according to an event for generation of a user account. For example, when the electronic apparatus 100 provides different services for respective users, to this end, the electronic apparatus 100 may provide a character input mode for generation of a user account, to this end. Here, the user account may be generated based on an ID (e.g., a user E-mail address) and a password input by a user. However, the present invention is not limited thereto. Needless to say, a name, a telephone number, an SNS account, etc. may also be required to generate an account according to information required during account generation.

In this case, the controller 130 may store information corresponding to a fingerprint received from the user terminal apparatus 200 as authentication information about a user account generated in a character input mode for generation of a user account and perform authentication on the corresponding account based on the stored information when next authentication for the user account is required.

That is, in response to a user account being generated via an account generating image, the controller 130 may store information corresponding to the user fingerprint received together as authentication information that replaces an ID and password of a user and perform authentication using the corresponding fingerprint information during next authentication. For example, the controller 130 may connect the information corresponding to the received user fingerprint to the user ID and store the information to perform user authentication based on the fingerprint input instead of the password during next authentication.

However, the present invention is not limited thereto. However, the character input mode for generation of a user account may be various character input modes for generation an account such as a character input mode for generation of an SNS account, a character input mode for generation an E-mail account, etc. Accordingly, the information about the user fingerprint received in the corresponding character input mode may be used as authentication information for login for an SNS account, an E-mail account, etc.

The information corresponding to the user fingerprint received from the user terminal apparatus 200 may be generated based on information recognized through a fingerprint scan sensor (or a fingerprint scan module) included in a preset button area that receives a user command for character input on the character input UI in the user terminal apparatus 200. For example, the preset button area may be a button area required for character input, for example, an area including a confirmation button unit for inputting a text selected by a selection GUI such as a cursor on the character input UI, but is not limited thereto. For example, an input button for "@" required to input an E-mail address may include a fingerprint scan sensor or a four-direction button area may include a fingerprint scan sensor.

In this case, upon entering a character input mode for generation of a user account, the controller 130 may transmit a corresponding signal to the user terminal apparatus 200 to activate a fingerprint scan sensor included in the preset button area.

That is, while deactivating the fingerprint scan sensor included in the preset button area, the user terminal apparatus 200 may activate the fingerprint scan sensor only upon receiving a signal indicating entrance to a user account generating mode from the electronic apparatus 100.

However, this is merely exemplary, and thus the fingerprint scan sensor included in the preset button area may be activated according to a signal input from the user terminal apparatus 200 itself. For example, when the user terminal apparatus 200 includes a button for receiving a user command for entrance to a mode for user account generation, the user terminal apparatus 200 may activate the fingerprint scan sensor included in preset button area based on input of the corresponding button and transmit a signal corresponding to input of the corresponding button to the electronic apparatus 100 such that the electronic apparatus 100 enters the mode for user account generation. In addition, when the user terminal apparatus 200 includes a display and is configured to perform mirroring on a UI image of the electronic apparatus 100 and to receive a command for controlling the electronic apparatus 100 through the corresponding UI image, the user terminal apparatus 200 may also activate the fingerprint scan sensor included in the preset button area according to a user command input through the UI image of the user terminal apparatus 200.

A plurality of pieces of user fingerprint information recognized by the user terminal apparatus 200 may be received whenever a confirmation signal is received according to user input to a confirmation button area or may be received at one time when a text input mode for user account generation is ended. In the latter case, the plurality of pieces of recognized user fingerprint information may be simply received at one time or one piece of fingerprint information obtained by integrating a plurality of pieces of fingerprint information may be received.

The controller 130 may separately store a plurality of pieces of fingerprint information received during generation of user account or may integrate and store a plurality of pieces of fingerprint information as one piece of fingerprint information. In the latter case, the controller 130 may analyze a plurality of pieces of fingerprint information corresponding to at least one different partial region of user fingers and generate and store one piece of complete fingerprint information.

Then the controller 130 may perform user authentication based on fingerprint information stored in response to a user authentication event occurring.

For example, when a plurality of pieces of fingerprint information are separately stored, it may be determined whether fingerprint information matched with fingerprint information received from the user terminal apparatus 200 for user authentication is present among the plurality of pieces of stored fingerprint information and fingerprint authentication may be performed.

As another example, when one piece of fingerprint information obtained by integrating a plurality of pieces of fingerprint information is stored, it may be determined whether fingerprint information matched with fingerprint information received from the user terminal apparatus 200 for user authentication is present from the stored fingerprint information and fingerprint authentication may be performed.

Figure 2B:
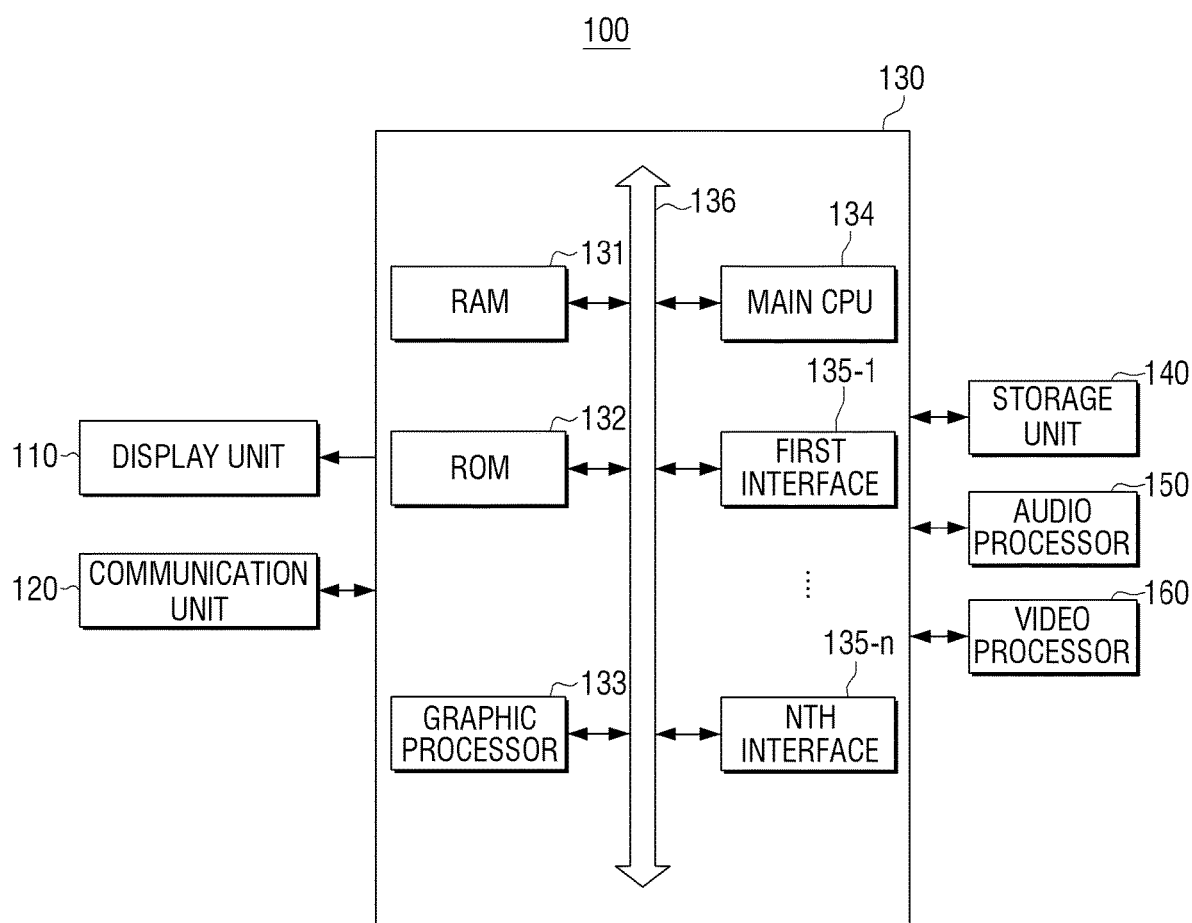
FIG. 2B is a block diagram illustrating a detailed configuration of the electronic apparatus illustrated in FIG. 2A.

FIG. 2B is a block diagram illustrating a detailed configuration of the electronic apparatus illustrated in FIG. 2A. As illustrated in FIG. 2B, according to an embodiment of the present invention, an electronic apparatus 100' includes the display unit 110, a user interface unit 120, the controller 130, a storage unit 140, an audio processor 150, and a video processor 160. Among components illustrated in FIG. 2B, a detailed description of the same components as in FIG. 2A will be omitted herein.

An image receiver (not shown) receives image data through various sources. For example, the image receiver (not shown) may receive broadcast data from an external broadcaster and receive image data from an external apparatus (e.g. a DVD or BD player, etc.).

The storage unit 140 stores various modules for driving the electronic apparatus 100. For example, the storage unit 140 may store software including a base module, a sensing module, a communication module, a presentation module, a web browser module, and a service module. In this case, the base module is a basic module that processes a signal transmitted from each hardware included in the electronic apparatus 100 and transmits the signal to a higher layer module. The sensing module may be a module that collects information from various sensors and analyzes and manages the collected information and may include a face recognition module, a voice recognition module, a motion recognition module, an NFC recognition module, etc. The presentation module is a module for configuring a display image and may include a multimedia module for reproducing and outputting multimedia content and a UI rendering module for performing UI and graphic processing. The communication module is a module for performing communication with an external device. The web browser module refers to a module that performs web browsing to access a web server. The service module is a module including various applications for providing various services.

As described above, the storage unit 140 may store information corresponding to a user fingerprint received from the user terminal apparatus 200 as authentication information about a generated user account in a character input mode for user account generation.

Although the aforementioned embodiment has been described with regard to the case in which information about a user account and a user fingerprint corresponding to the user account are stored in the electronic apparatus 100, this is merely exemplary. Thus, corresponding information may be stored in an external device connected through a network, for example, an external server.

The audio processor 150 is a component for performing processing on audio data. The audio processor 150 may perform various processes such as decoding, amplification, noise filtering, etc. on audio data.

The video processor 160 is a component that performs processing on image data received by an image receiver (not shown). The video processor 160 may perform various image processes such as decoding, scaling, noise filtering, frame rate conversion, resolution conversion, etc. on image data.

The controller 130 controls an overall operation of the electronic apparatus 100' using various programs stored in the storage unit 140.

As illustrated in FIG. 2B, the controller 130 includes a random access memory (RAM) 131, a read only memory (ROM) 132, a graphic processor 133, the main CPU 134, first to nth interfaces 135-1 to 135-n, and a bus 136. In this case, the RAM 131, ROM 132, the graphic processor 133, a main central processing unit (CPU) 134, the first to nth interfaces 135-1 to 135-n, etc. may be connected to each other through the bus 136.

A command set, etc. for system booting is stored in the ROM 132. Upon receiving a turn-on command to receive power, the main CPU 134 may copy an operating system (O/S) stored in the storage unit 140 to the RAM 131 according to a command stored in the ROM 132 and execute the O/S to boot a system. In response to booting being completed, the main CPU 134 copies various applications programs stored in the storage unit 140 to the RAM 131 and executes the application programs copied to the RAM 131 to perform various operations.

The graphic processor 133 generates an image including various objects such as an icon, an image, a text, etc. using a calculator (not shown) and a rendering unit (not shown). The calculator calculates a attribute value such as a coordinate value, a shape, a size, color, etc. for displaying each object according to layout of an image using a control command received through the user interface unit 120. The rendering unit generates images of various layouts including an object based on the attribute value calculated by the calculator. The image generated by the rendering unit is displayed in a display area of the display unit 110.

The main CPU 134 accesses the storage unit 140 and performs booting using the O/S stored in the storage unit 140. In addition, the main CPU 134 performs various operations using various programs, content, data, etc. stored in the storage unit 140.

The first to nth interfaces 135-1 to 135-n are connected to the aforementioned various components. One of the interfaces may be a network interface connected to an external device.

Figure 3A:
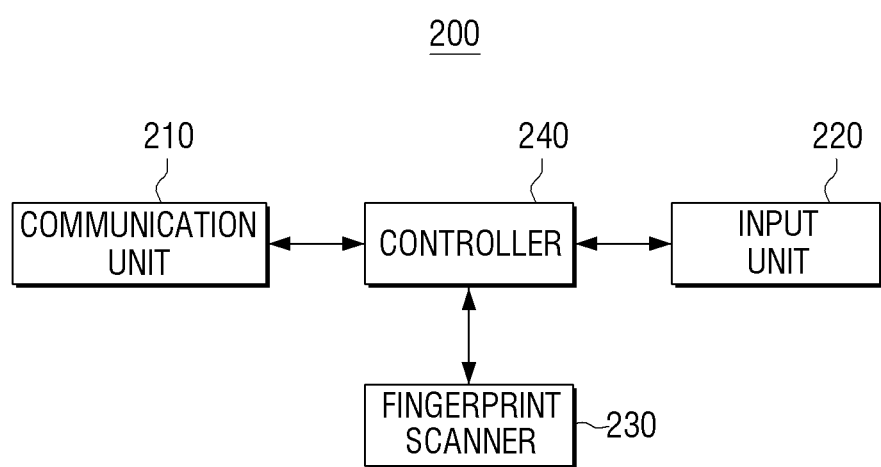
FIG. 3A is a block diagram illustrating a configuration of a user terminal apparatus according to an embodiment of the present invention.

FIG. 3A is a block diagram illustrating a configuration of the user terminal apparatus 200 according to an embodiment of the present invention.

Referring to FIG. 3A, the user terminal apparatus 200 includes a communication unit 210, an input unit 220, a fingerprint scanner 230, and a controller 240.

The communication unit 210 communicates with the electronic apparatus 100.

In detail, the communication unit 210 may perform communication according to various communication schemes such as WiFi communication, Bluetooth communication, infrared communication, etc. to transmit a signal corresponding to a user command input through the input unit 220 that will be described later to the electronic apparatus 100.

The input unit 220 receives various user commands for control of the electronic apparatus 100.

To this end, the input unit 220 may include a four-direction button unit, a confirmation unit, a power button unit, etc. The four-direction button unit may receive a user command for four-direction manipulation of a selection GUI such as a cursor, etc. displayed on a UI image provided on the electronic apparatus 100. In addition, the confirmation button unit may receive a user command for performing a function corresponding to a specific object in a state in which a cursor is positioned on the corresponding object on a UI image. For example, in response to a signal of the confirmation button unit being input in a state in which the cursor is positioned on a specific character item on a character input UI, a text corresponding to the corresponding character item may be input.

In addition, the input unit 220 may further include various button units for receiving various user commands required for control of the electronic apparatus 100, for example, a channel control button, a volume control button, etc.

The fingerprint scanner 230 is included in a preset button area of the input unit 220 의 preset button area and recognizes a user fingerprint. Here, the preset button area may be, but is not limited to, an area in which the aforementioned confirmation button unit is provided. Fingerprint scan technology is one of biometrics technologies and is an authentication method of extracting different pieces of fingerprint information for respective individuals to make information. Since a fingerprint has property whereby the fingerprint is not changed as long as a corium part is not damaged, fingerprint scan is used to recognize individuals. The fingerprint scan sensor included in the fingerprint scanner 230 may generate fingerprint data corresponding a fingerprint shape of a fingerprint that contacts a sensor surface according to the amount of current that varies while the fingerprint contacts the sensor surface.

Figure 4:
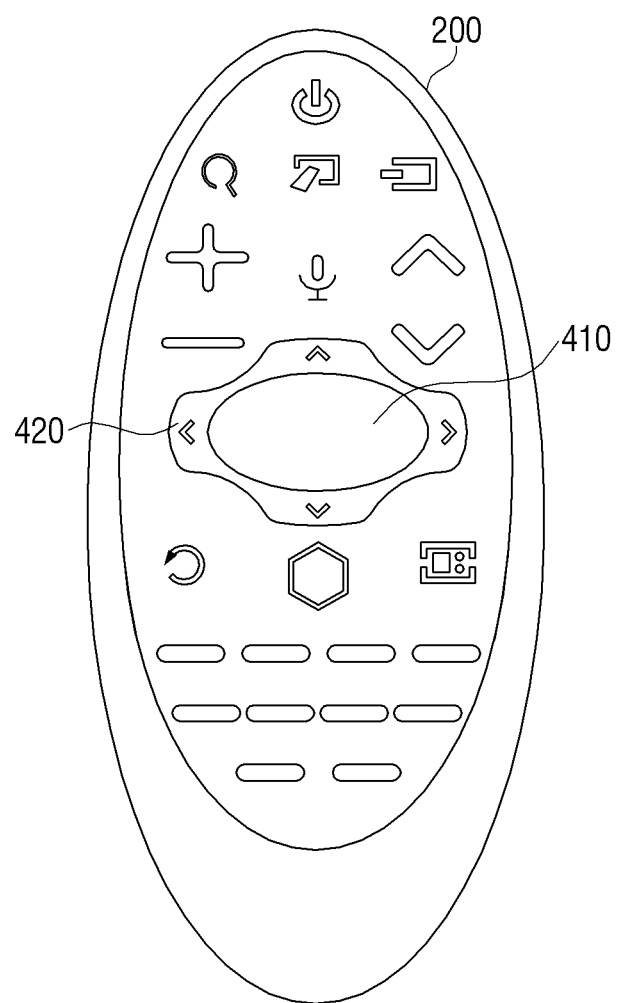
FIG. 4 is a diagram illustrating an outer appearance of a user terminal apparatus according to an embodiment of the present invention.

FIG. 4 is a diagram illustrating an outer appearance of the user terminal apparatus 200 according to an embodiment of the present invention.

As illustrated in FIG. 4, when the user terminal apparatus 200 is embodied as a remote controller, a fingerprint scan sensor may be provided in an area of a confirmation button unit 410 that receives a confirmation or selection command. In addition, a four-direction button unit 420 that receives a user command for four-direction manipulation may be provided in an area outside the confirmation button unit 410.

Based on this configuration, a user may manipulate movement of a cursor on a character item positioned on a character input UI displayed on the electronic apparatus 100 through the four-direction button unit 420 and perform character input on a character item selected by the cursor through the confirmation button unit 410. Accordingly, whenever the user selects and inputs a character item, a fingerprint may be recognized through the fingerprint scan sensor provided in the confirmation button unit 410 and the recognized information may be transmitted to and stored in the electronic apparatus 100.

However, the aforementioned configuration of the user terminal apparatus 200 is merely exemplary. If necessary, a fingerprint scan sensor may be disposed in an area of the four-direction button unit 420 or may be disposed in another button area that receives a user command required for generation of a user account.

Figure 5A:
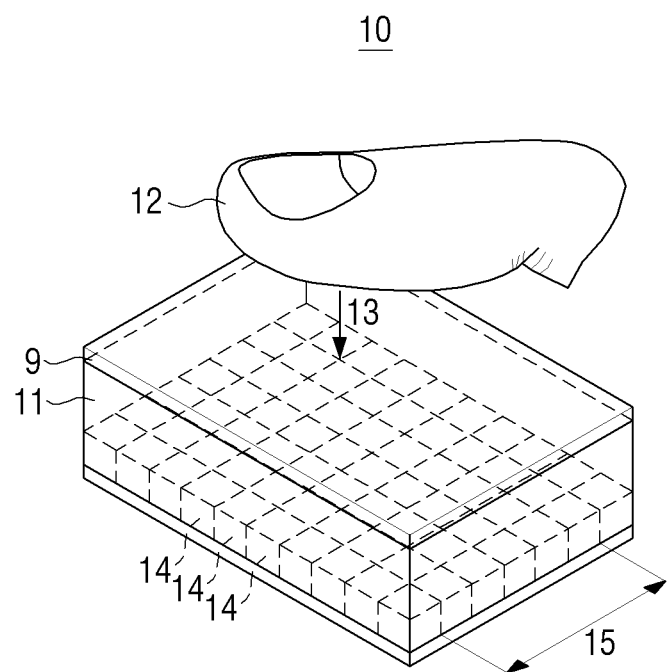
FIGS. 5A and 5B are diagrams illustrating a configuration of a fingerprint scan sensor according to an embodiment of the present invention.
Figure 5B:
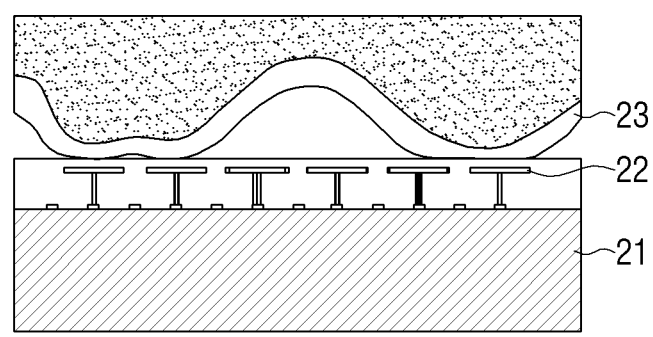

FIGS. 5A and 5B are diagrams illustrating a configuration of a fingerprint scan sensor according to an embodiment of the present invention.

According to a fingerprint scan sensor 10 illustrated in FIG. 5A, in response to a piezoelectric thick film 11 being pressed by a finger, a current density value at a contact portion is varied by a pressure 13 according to a fingerprint 12 of the finger. The current density value may be read by an output line 15 through a sensing device 14 to recognize the fingerprint 12.

According to a fingerprint scan sensor 20 illustrated in FIG. 5B, a principle of a capacitive CMOS sensor is used. That is, capacitance of a sensor surface 22 and a fingerprint 23 may be measured and converted into an electrical signal so as to realize a digital image and to recognize a fingerprint.

However, the above FIGS. 5A and 5B show an example of the fingerprint scan sensor. Needless to say, the fingerprint scan sensor may be embodied in various forms adoptable in the art.

The controller 240 controls an overall operation of the user terminal apparatus 200.

In particular, in response to the electronic apparatus 100 entering a preset character input mode, the controller 240 may recognize a user fingerprint according to user input to a preset button area and transmit information corresponding to the recognized user fingerprint to the electronic apparatus 100. Here, the preset button area may be a confirmation button area (an area of the confirmation button unit 410 of FIG. 4) including the aforementioned fingerprint scanner 230.

In detail, upon receiving a user command for selection of a specific text on a character input UI displayed on the electronic apparatus 100 in a preset character input mode through a preset button area, the controller 240 may recognize a user fingerprint according to input and transmit information corresponding to the recognized user fingerprint to the electronic apparatus 100. Here, the user terminal apparatus 200 may determine that the electronic apparatus 100 enters a preset character input mode based on a signal received from the electronic apparatus 100 or an event (e.g., button press for account generation) generated by the user terminal apparatus 200.

A preset character input mode for recognition of a user fingerprint in the preset button area may be a character input mode for generation of a user account. For example, the user account may include various user accounts such as a user account for using a service provided from the electronic apparatus 100, an SNS account, an E-mail account, etc.

The controller 240 may control whether the fingerprint scanner 230 is activated according to whether user fingerprint scan is required.

In detail, the controller 240 may activate the fingerprint scanner 230 in response to a preset event occurring in a state in which the fingerprint scanner 230 is deactivated.

In particular, in response to the electronic apparatus 100 entering a character input mode, the controller 240 may activate the fingerprint scanner 230, and in response to the electronic apparatus 100 getting out of a preset character input mode, the controller 240 may deactivate the fingerprint scanner 230.

In addition, in response to a user authentication event occurring in the electronic apparatus 100, the controller 240 may activate the fingerprint scanner 230. When a fingerprint is registered for a user account and then an authentication event associated with a corresponding user account occurs, the controller 240 may activate the fingerprint scanner 230.

In this case, the controller 240 may determine whether the electronic apparatus 100 enters a preset character input mode and the user authentication event occurs, based on a signal received from the electronic apparatus 100. For example, when the electronic apparatus 100 enters a character input mode for user account generation or authentication is required for a pre-generated user account, a signal for activating a fingerprint scan sensor provided in a preset button area of the user terminal apparatus 200 may be transmitted to the user terminal apparatus 200.

However, the present invention is not limited thereto, and it is possible to activate the deactivated fingerprint scanner 230 according to a user command input from the user terminal apparatus 200. This has been described above and thus a detailed description thereof will be omitted herein.

Upon recognizing a user fingerprint in a confirmation button area, the controller 240 may transmit information corresponding to a fingerprint recognized whenever the fingerprint is recognized to the electronic apparatus 100. For example, the controller 240 may transmit a confirmation signal according to user input to the confirmation button area together with information about the recognized fingerprint to the electronic apparatus 100. Accordingly, the electronic apparatus 100 may receive the recognized fingerprint information by as much as the number of received confirmation signals.

Alternatively, the controller 240 may transmit a plurality of pieces of fingerprint information recognized in a character input mode for user account generation at one time in response to the corresponding character input mode being ended. In this case, although the controller 240 may simply transmit the plurality of pieces of recognized fingerprint information at one time, it is possible to integrate and transmit the plurality of pieces of recognized fingerprint information as one piece of fingerprint information. In this case, the user terminal apparatus 200 may store an algorithm for integrating a plurality of pieces of fingerprint information as one piece of fingerprint information.

Accordingly, even if the user does not perform a separate fingerprint scanning process, a fingerprint for an automatically generated user account may be recognized and registered.

Figure 3B:
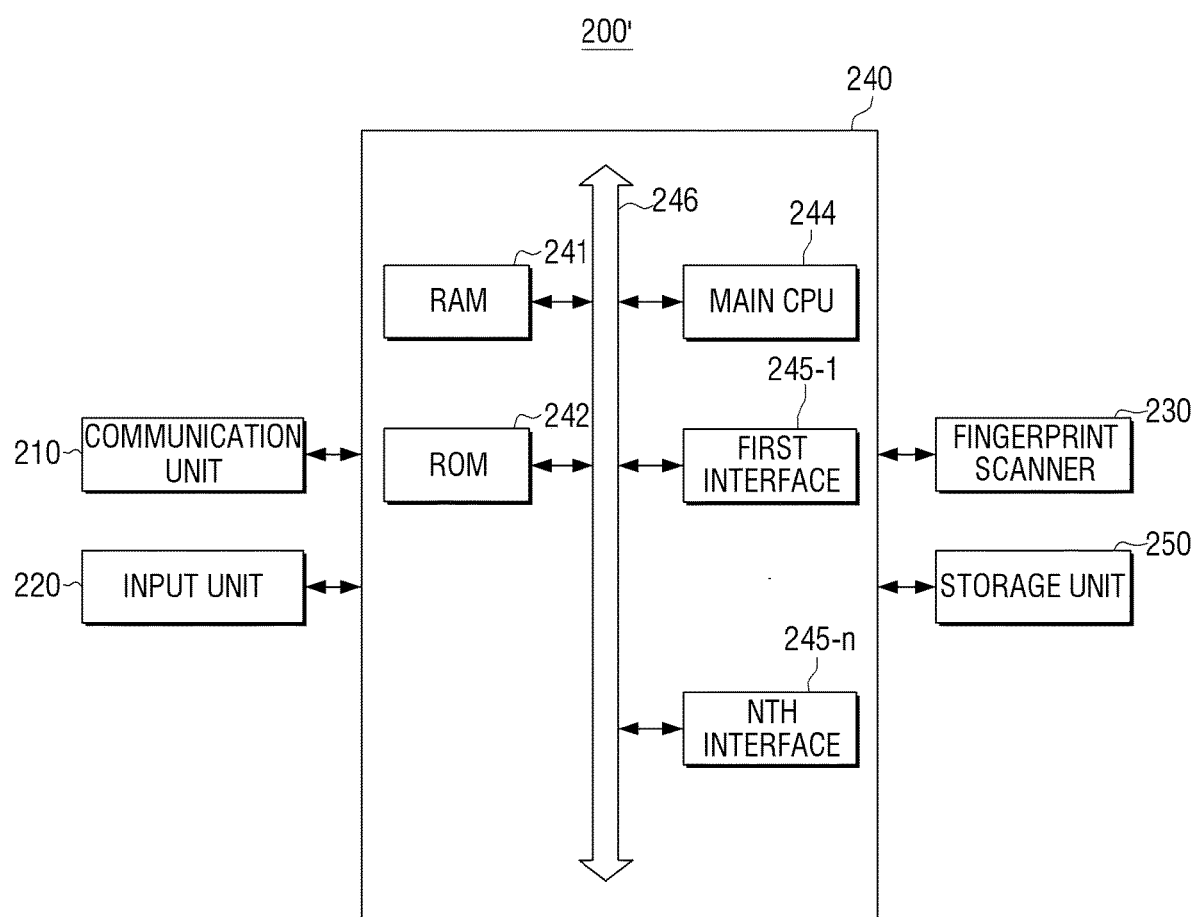
FIG. 3B is a block diagram illustrating a detailed configuration of the user terminal apparatus illustrated in FIG. 3A.

FIG. 3B is a block diagram illustrating a detailed configuration of the user terminal apparatus 200 illustrated in FIG. 3A. As illustrated in FIG. 3B, a user terminal apparatus 200' according to an embodiment of the present invention includes the communication unit 210, the input unit 220, the fingerprint scanner 230, the controller 240, and a storage unit 250. Among components illustrated in FIG. 3B, a detailed description of the same components as in FIG. 3A will be omitted herein.

A detailed configuration of the controller 240 is the same as that of the controller 130 of the electronic apparatus 100' illustrated in FIG. 2B, and thus a detailed description thereof will be omitted herein.

The storage unit 250 stores various modules for driving the user terminal apparatus 200'. For example, the storage unit 250 may store software including a base module, a sensing module, and a communication module. The sensing module may be a module that collects information from various sensors and analyzes and manages the collected information and may include, in particular, a fingerprint scan sensor.

In addition, as described above, the storage unit 140 may store information corresponding to a user fingerprint received from the user terminal apparatus 200 as authentication information about a generated user account in a character input mode for user account generation.

FIG. 6 is a set of diagrams for explanation of a method of registering a fingerprint according to text input according to an embodiment of the present invention.

Figure 6A:
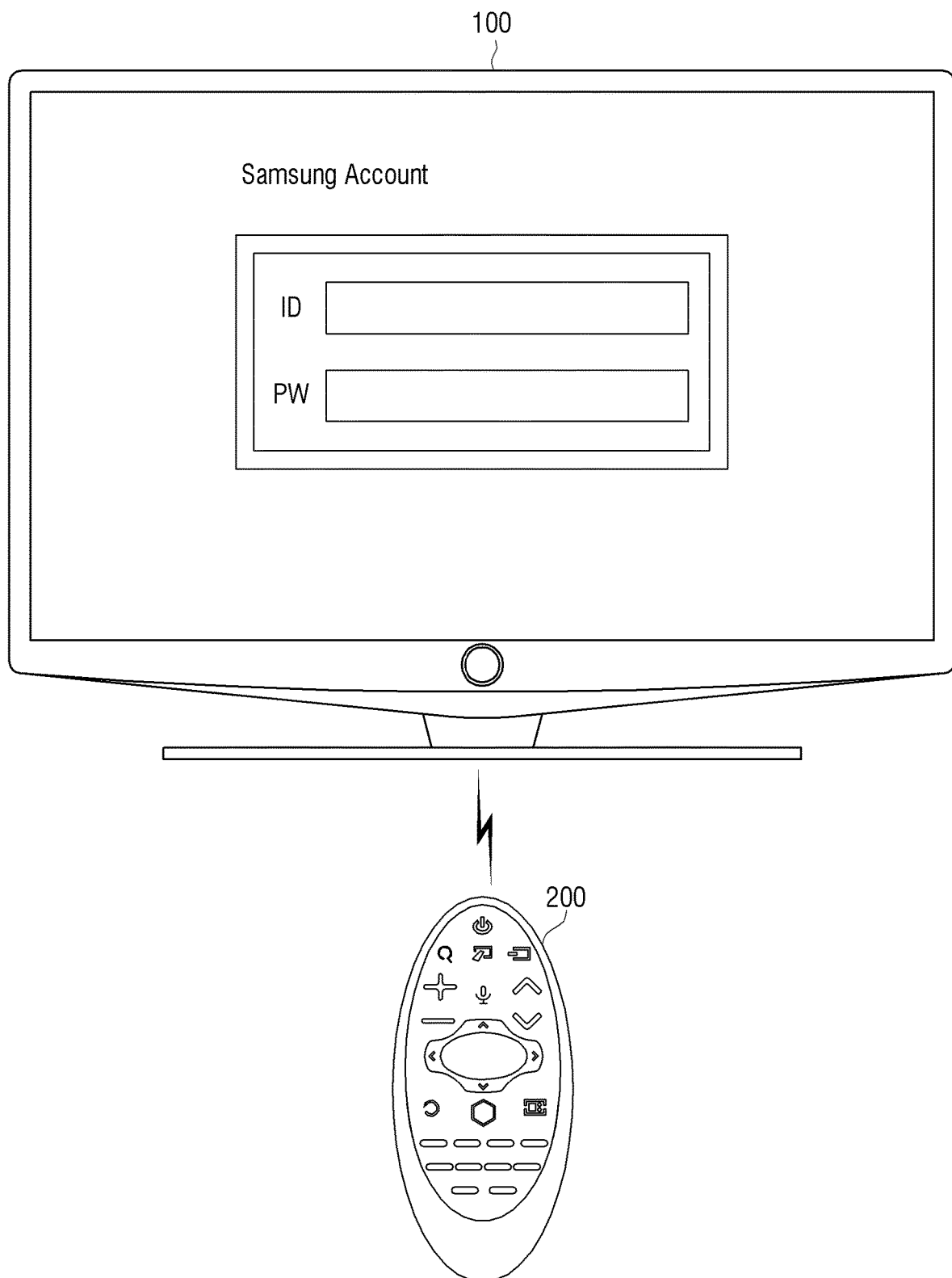
FIGS. 6A to 6E are a set of diagrams for explanation of a method of registering a fingerprint according to text input according to an embodiment of the present invention.

As illustrated in FIG. 6(A), it is assumed that a user generates a user account in the electronic apparatus 100. For example, as illustrated in FIG. 6(A), the user may generate a user account for using a service provided by the electronic apparatus 100 according to input of ID and PASSWORD.

Figure 6B:
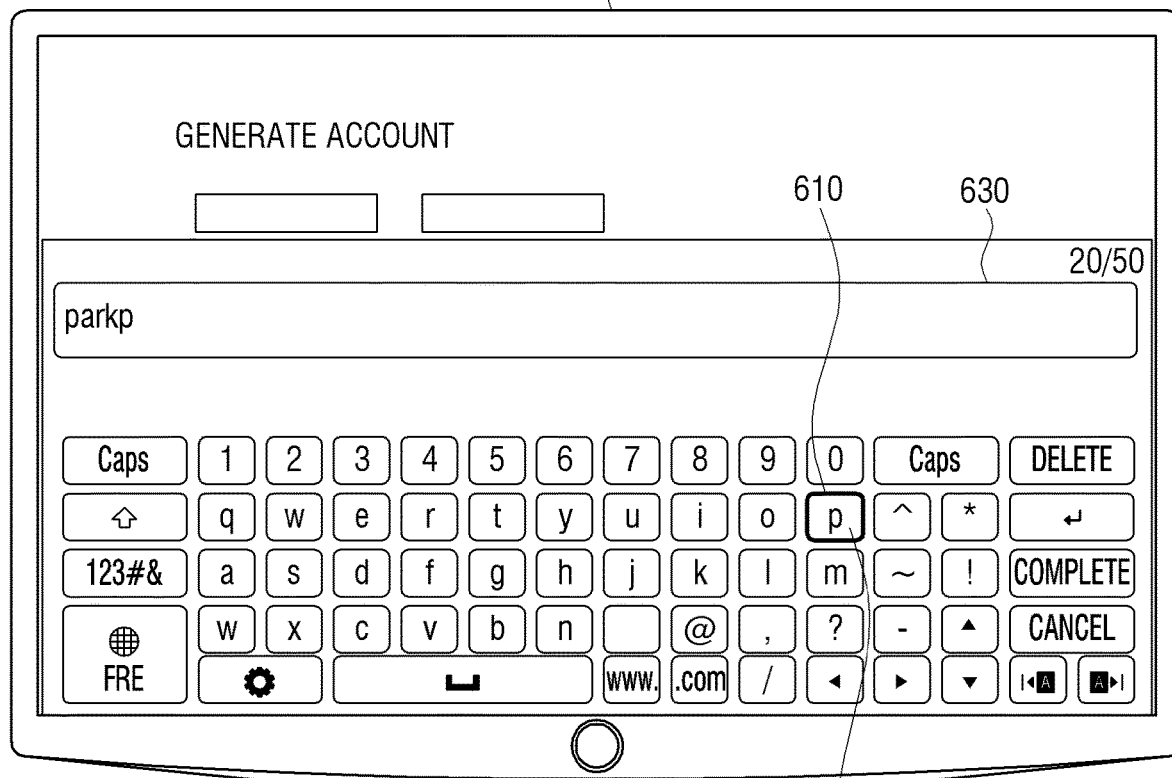
Figure 6B:
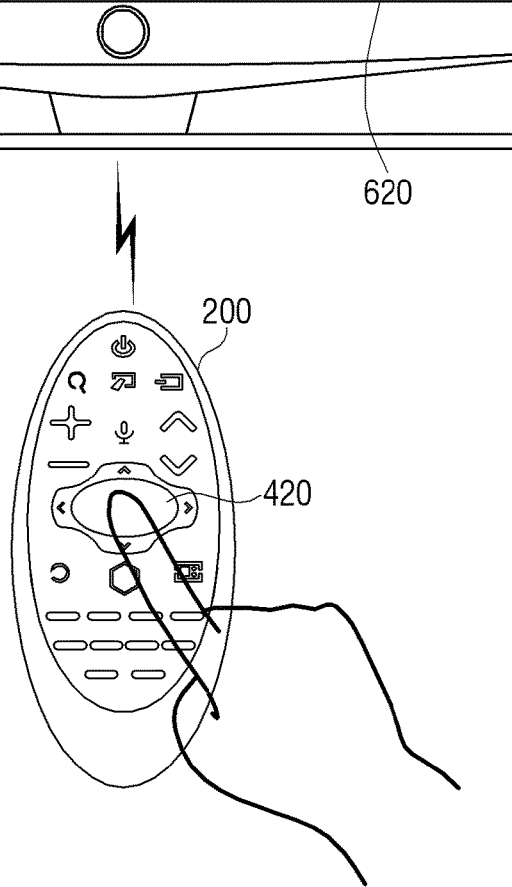

In this case, as illustrated in FIG. 6(B), the electronic apparatus 100 may provide a character input UI such that a user may move a position of a cursor 610 on the character input UI to select a desired text. In this case, the position of the cursor 610 may be moved and manipulated through a four-direction button of the user terminal apparatus 200.

For example, as illustrated in FIG. 6(B), in a state in which the cursor 610 is positioned on a character item "p" 620, in response to a confirmation button 420 of the user terminal apparatus 200 being pressed and manipulated, a character 'p' corresponding to the selected character item "p" 620 may be input to a character input window 630. In this case, in response to the confirmation button 420 being pressed and manipulated, a user fingerprint may be recognized together. As such, the confirmation button 420 is pressed and manipulated by as much as a character input number of times and a user fingerprint is recognized by as much as a pressing and manipulating number of times of the confirmation button 420.

Figure 6C:
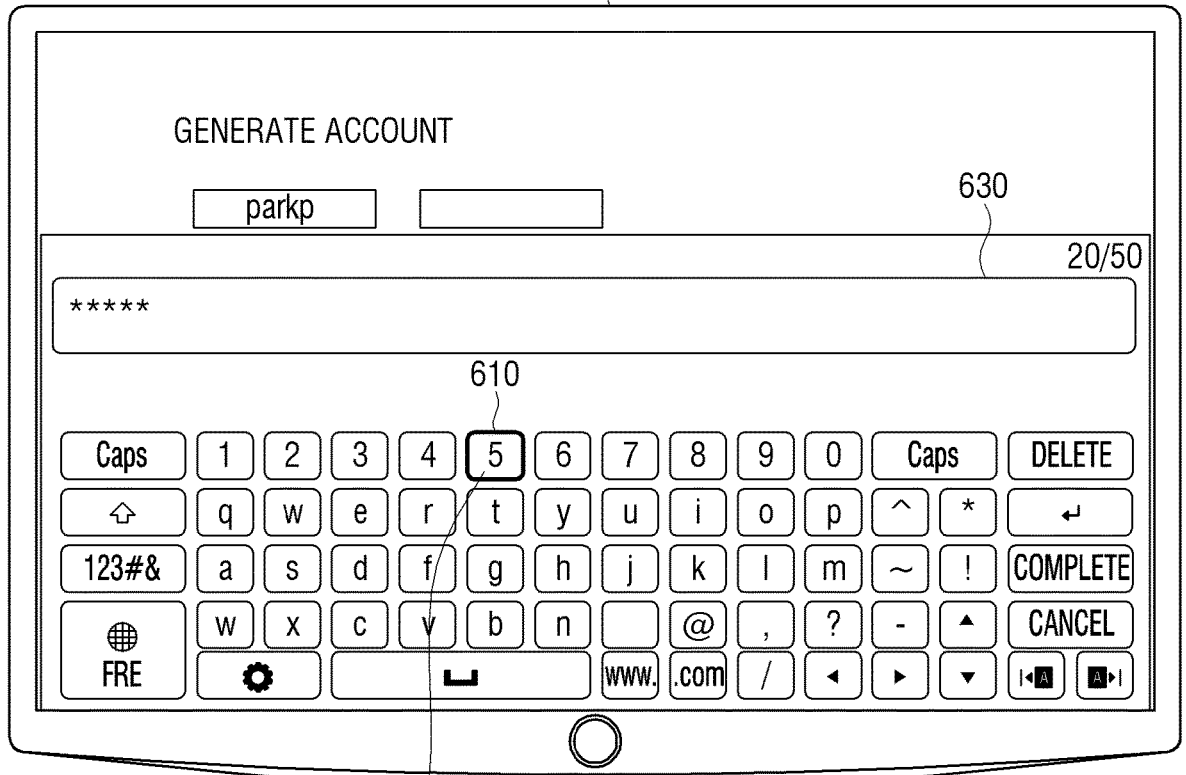
Figure 6C:
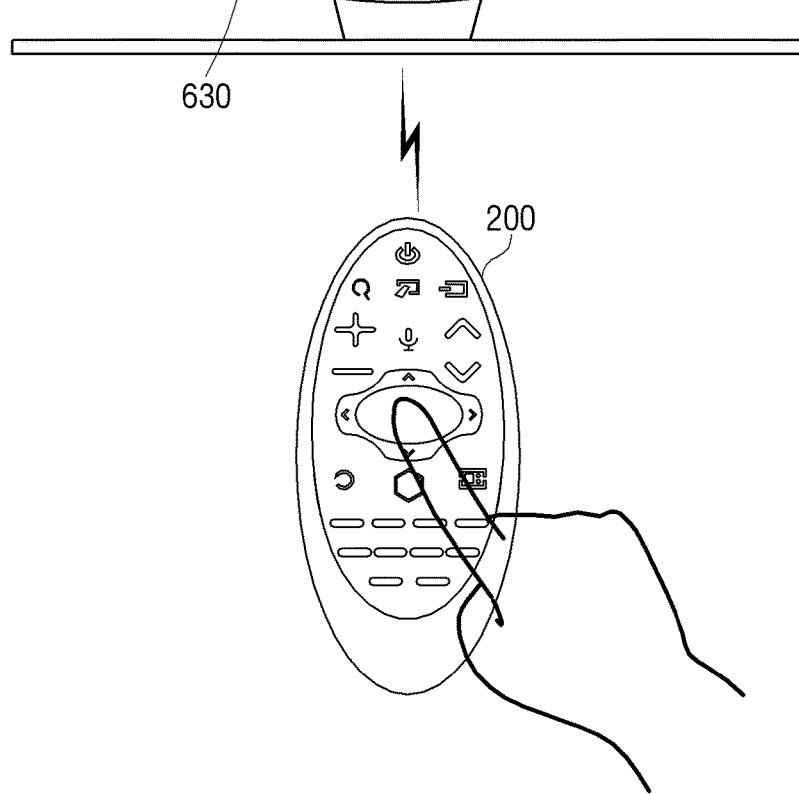

As illustrated in FIG. 6(C), in response to PASSWORD for account generation being input, the confirmation button 420 is also pressed and manipulated by as much as a character input number of times and a user fingerprint is also recognized by as much as a pressing and manipulating number of times of the confirmation button 420.

Figure 6D:
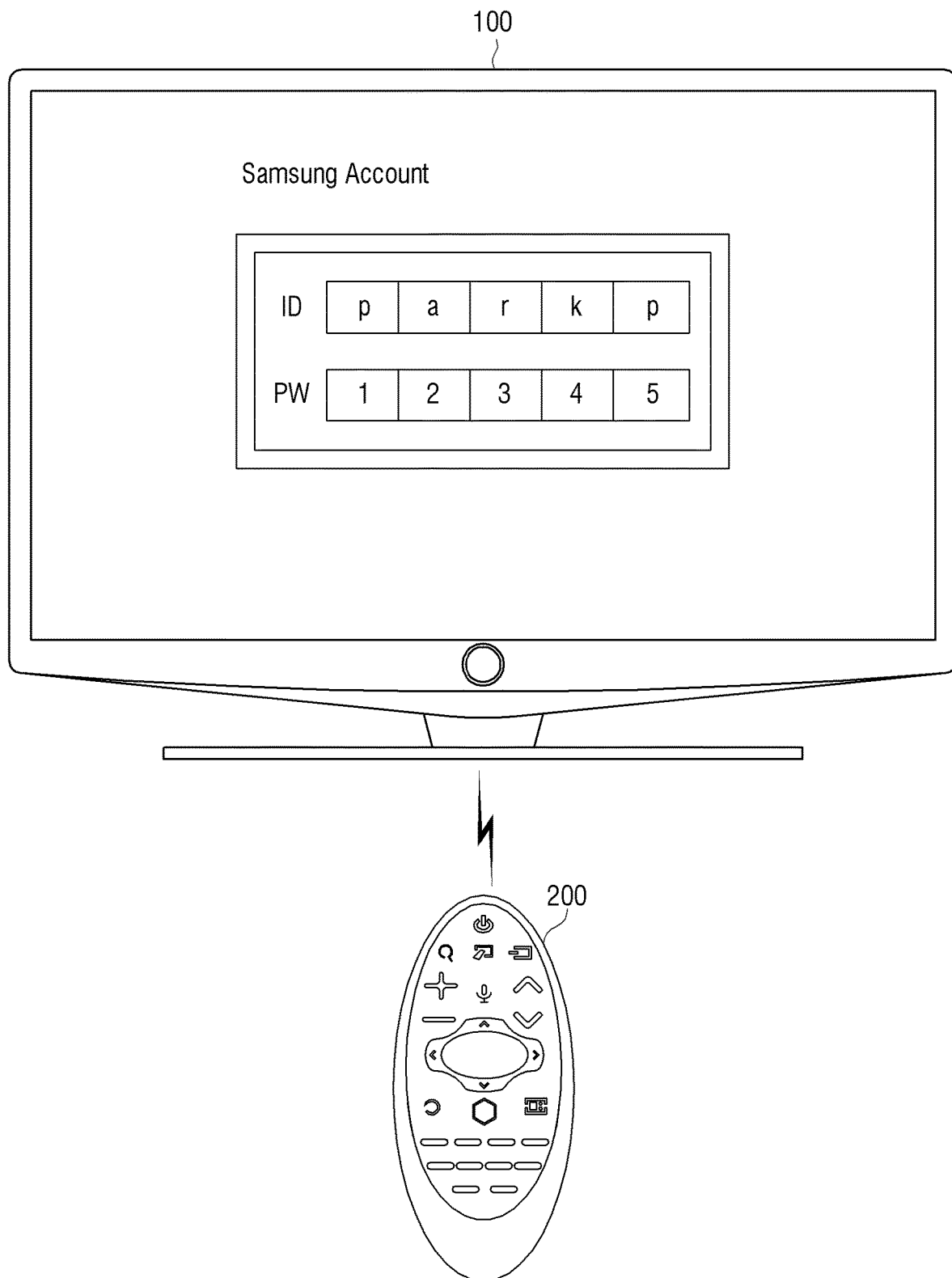

For example, as illustrated in FIG. 6(D), when it is assumed that ID including 5 characters and PASSWORD including 5 characters are input without correction during user account generation, a user fingerprint is recognized a character input number of times, i.e. 10 times and 10 pieces of fingerprint information may also be generated.

Figure 6E:
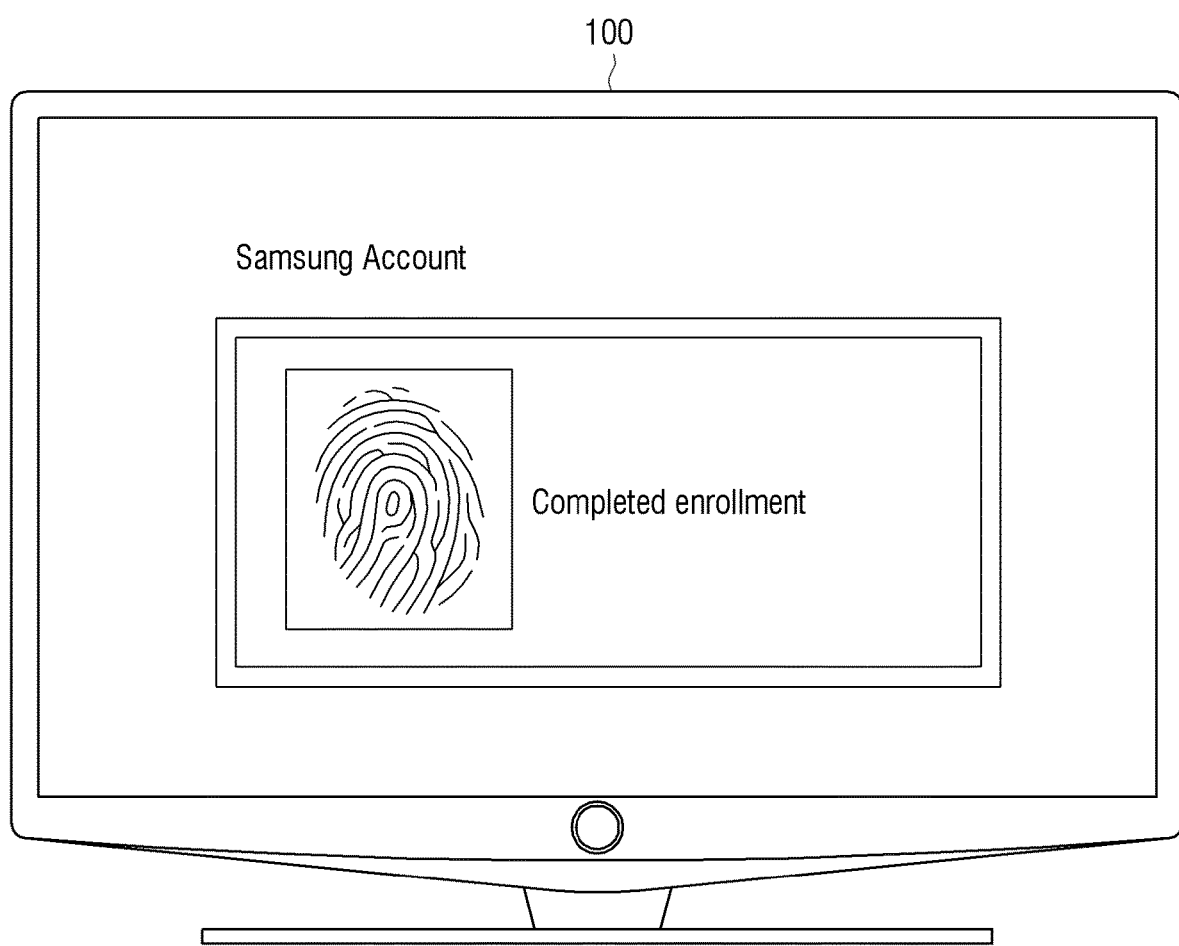

As illustrated in FIG. 6(E), the recognized fingerprint information may be transmitted to the electronic apparatus 100 and registered for authentication information for a generated user account. In this case, the registered fingerprint information may be one piece of integrated fingerprint information obtained by integrating 10 pieces of fingerprint information as described, but if necessary, 10 pieces of fingerprint information may be separately registered as respective pieces of information.

Then in response to an authentication event for the corresponding user account occurring, the registered fingerprint information may be used as authentication information.

FIG. 7 is a set of diagrams for explanation of an authentication method according to registered fingerprint information in response to an authentication event occurring according to an embodiment of the present invention.

Figure 7A:
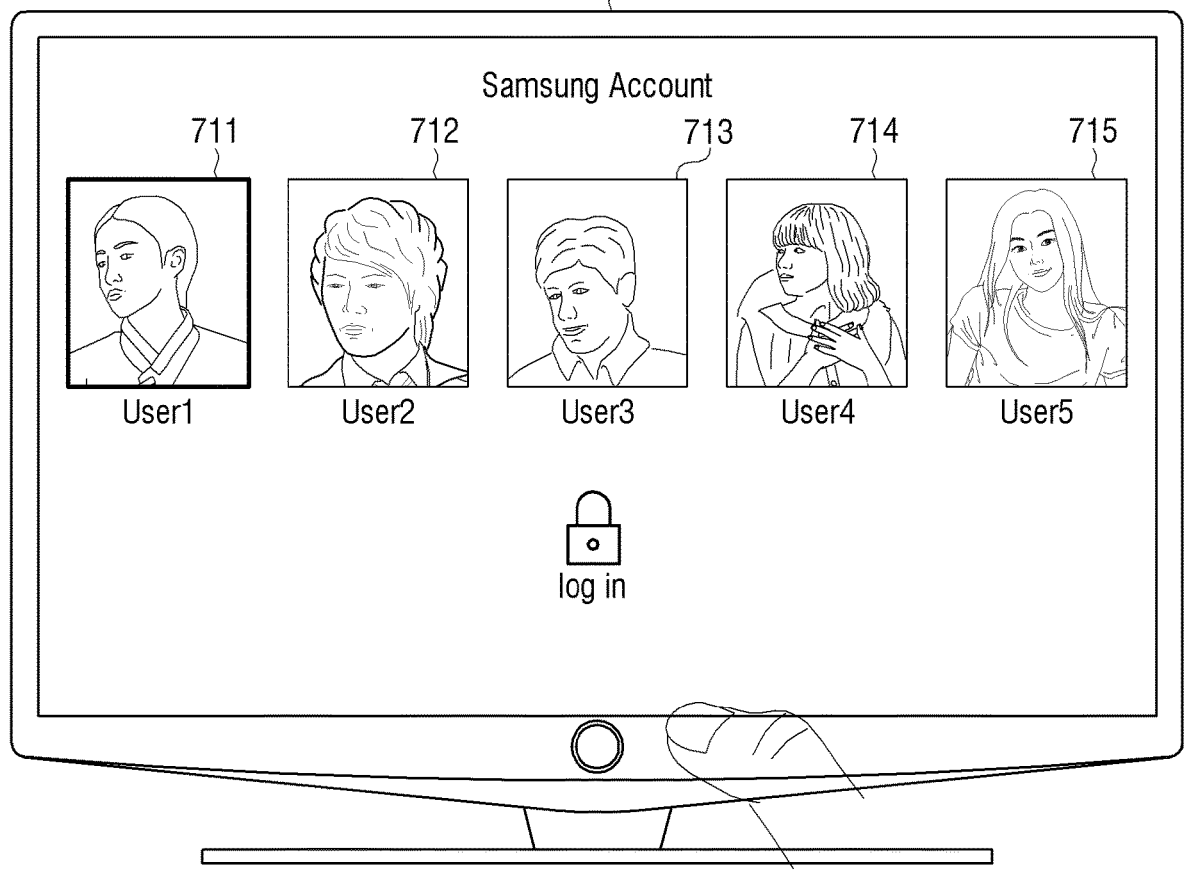
FIGS. 7A and 7B are a set of diagrams for explanation of an authentication method according to registered fingerprint information in response to an authentication event occurring according to an embodiment of the present invention.
Figure 7A:
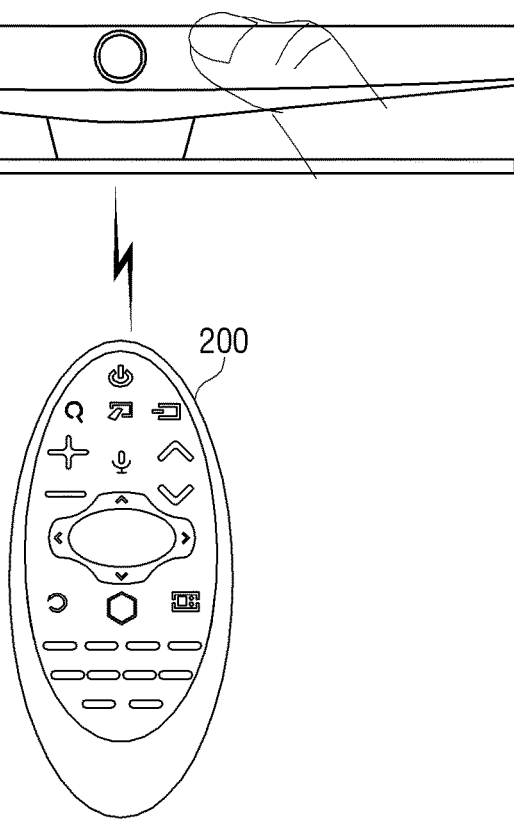

FIG. 7(A) illustrates the case in which an authentication event occurs in the electronic apparatus 100 according to an embodiment of the present invention. The case illustrated in FIG. 7(A) may correspond to the case in which account login is required in order to use a service provided by the electronic apparatus 100.

For example, a UI image (or a UI image that requires ID input) including icons 711 to 715 indicating respective users may be provided, and a user may select a specific icon indicating himself or herself and attempt to login.

Figure 7B:
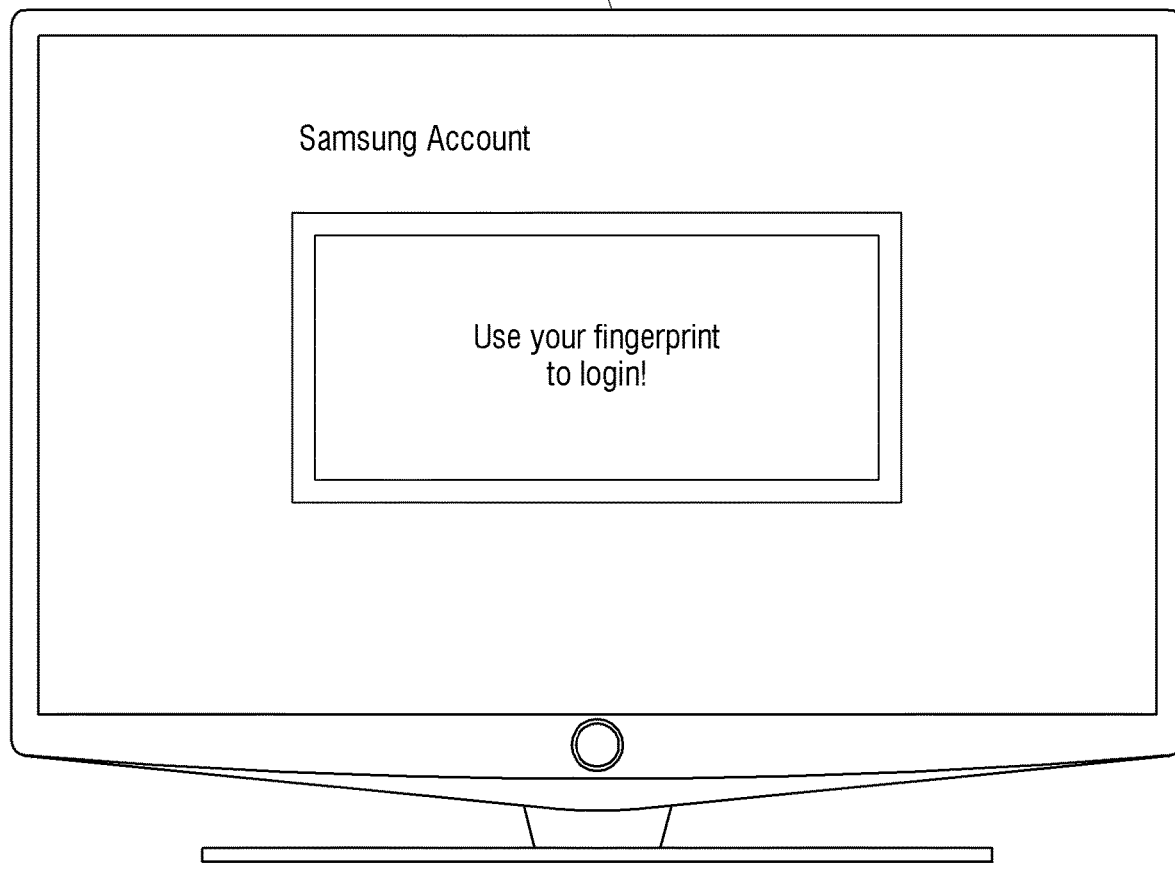
Figure 7B:
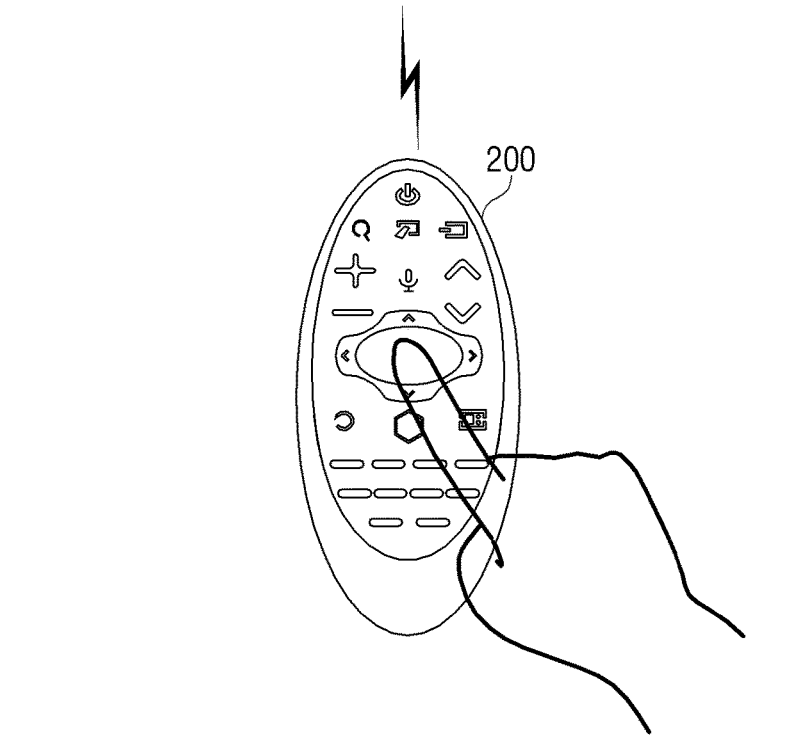

In response to the user selecting a specific item, a notification message for requesting fingerprint scan may be provided, as illustrated in FIG. 7(B).

In this case, the user may perform fingerprint scan through a preset area of the user terminal apparatus 100, that is, an area (e.g., a confirmation button area) including a fingerprint scan sensor for recognizing a fingerprint and perform authentication on a selected account. In response to an authentication system being released, a corresponding service image may be provided simply by selecting a user icon without a separate authentication procedure, but the present is not limited to this case, and thus a detailed description thereof will be omitted herein.

Figure 8A:
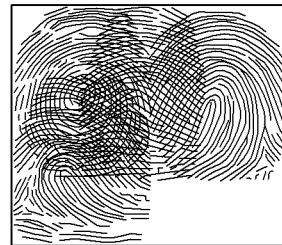
FIGS. 8A and 8B are diagrams for explanation of a method of registering a fingerprint according to various embodiments of the present invention.
Figure 8B:

FIGS. 8A and 8B are diagrams for explanation of a method of registering a fingerprint according to various embodiments of the present invention.

As illustrated in FIG. 8A, a plurality of pieces of fingerprint information recognized whenever a confirmation button area included in a fingerprint scan sensor is pressed and manipulated in a user terminal apparatus may be integrated and stored as one piece of fingerprint information.

For example, in response to the user pressing and manipulating the confirmation button area using an index finger, a position, visibility, etc. of recognized fingerprint information may be varied based on an actually pressed portion of the index fingerprint, a pressing strength, a pressing time, etc. One piece of complete fingerprint information obtained by integrating various pieces of fingerprint information and corresponding to the index finger may be generated and stored.

The fingerprint integrating procedure may be performed by the electronic apparatus 100, but when the user terminal apparatus 200 includes a corresponding algorithm, the fingerprint integrating procedure may be performed by the user terminal apparatus 200.

Alternatively, as illustrated in FIG. 8B, a plurality of pieces of fingerprint information recognized whenever a confirmation button area included in a fingerprint scan sensor in a user terminal apparatus is pressed and manipulated may separately be stored as respective pieces of fingerprint information.

In this case, in response to fingerprint information as a recognition target being received from the user terminal apparatus 200, matched fingerprint information is searched for among a plurality of pieces of fingerprint information and fingerprint scan may be performed.

Figure 9:
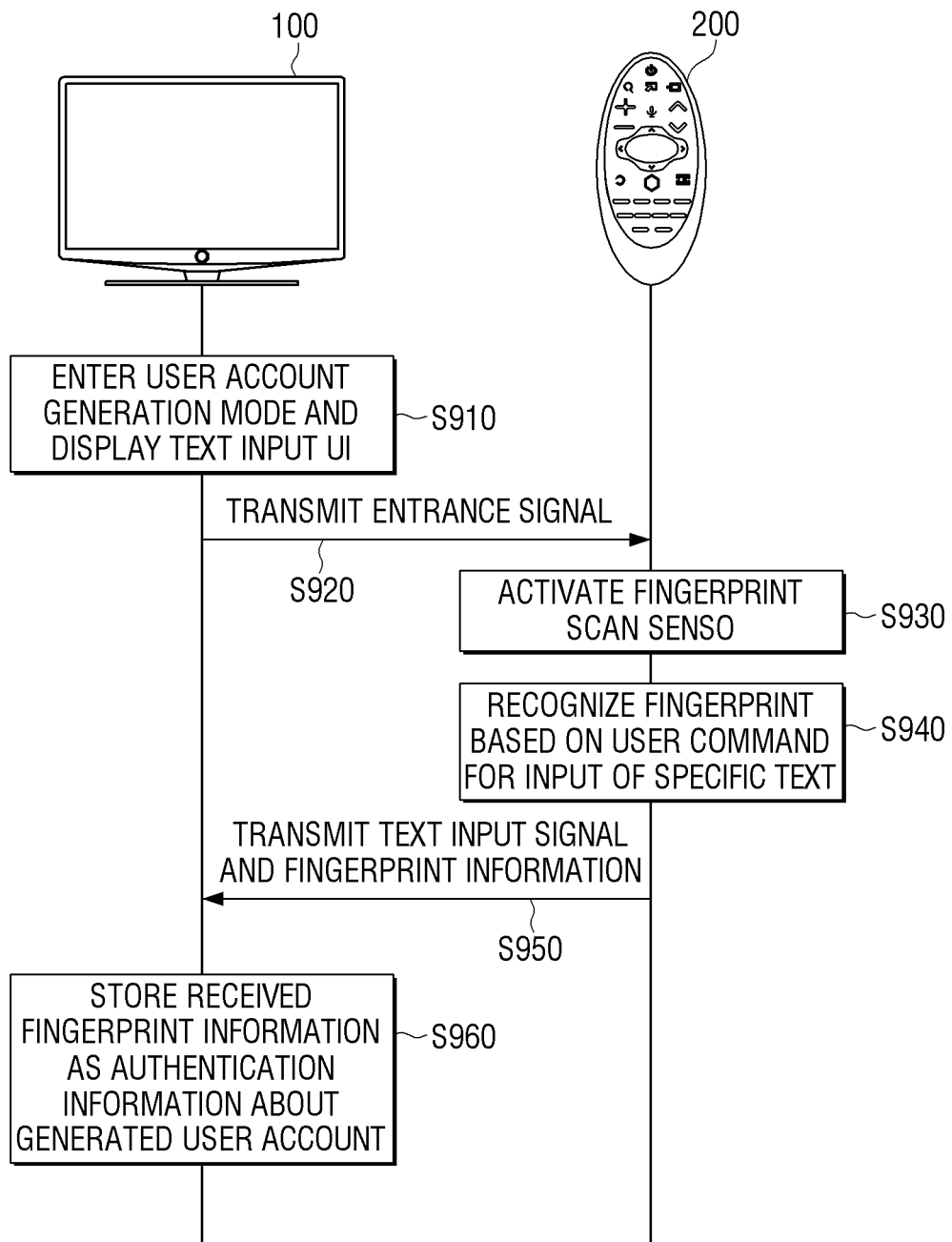
FIG. 9 is a sequence diagram for explanation of an operational correlation between an electronic apparatus and a user terminal apparatus according to an embodiment of the present invention.

FIG. 9 is a sequence diagram for explanation of an operational correlation between the electronic apparatus 100 and the user terminal apparatus 200 according to an embodiment of the present invention.

As illustrated in FIG. 9, in response to the electronic apparatus 100 entering a mode for user account generation, a character input UI may be displayed (S910) and a signal indicating that entrance to the corresponding mode may be transmitted to the user terminal apparatus 200.

In this case, the user terminal apparatus 200 may activate a fingerprint scan sensor included in a preset button area based on a received signal (S930). Here, the preset button area may be a button area required for character input, for example, a confirmation button area.

Then the user terminal apparatus 200 may perform text scan based on a user command for input of a specific text on the character input UI (S940). For example, in response to the confirmation button area being pressed and manipulated in order to input a specific text, a fingerprint may be automatically recognized during corresponding pressing and manipulation.

Then the user terminal apparatus 200 transmits fingerprint information recognized by pressing and manipulating the confirmation button area to the electronic apparatus 100 (S950). Here, the fingerprint information may be transmitted together with a signal corresponding to pressing and manipulation of the confirmation button area, that is, a character input signal, but is not limited thereto. For example, the fingerprint information may be transmitted to the electronic apparatus 100 at one time in response to a corresponding mode being ended.

The electronic apparatus 100 that receives fingerprint information from the electronic apparatus 100 registers and stores the received fingerprint information as authentication information about a generated user account (S960).

Then the electronic apparatus 100 may perform authentication based on registered fingerprint information in response to an authentication event for a corresponding user account occurring.

Figure 10:
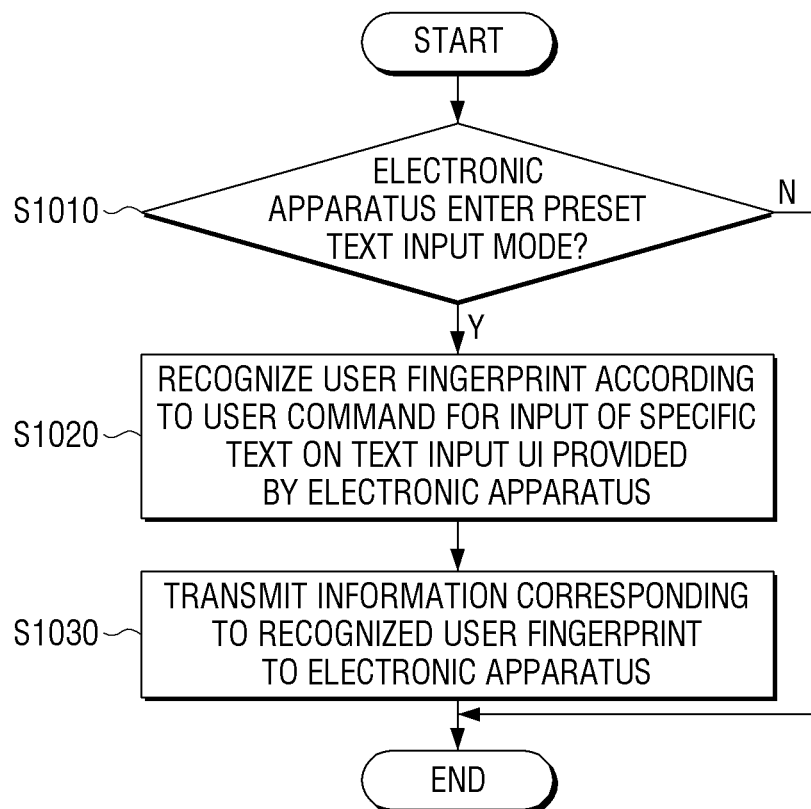
FIG. 10 is a flowchart of a method of controlling a user terminal apparatus according to an embodiment of the present invention.

FIG. 10 is a flowchart of a method of controlling a user terminal apparatus according to an embodiment of the present invention.

In the method of controlling the user terminal apparatus that performs a remote control function with respect to an electronic apparatus illustrated in FIG. 10, in response to the electronic apparatus 100 entering a preset character input mode (S1010: Y), the user terminal apparatus 200 recognizes a user fingerprint according to a user command for input of a specific text on a character input UI (S1020). Here, the preset character input mode may be a character input mode for user account generation.

Then information about the recognized user fingerprint is transmitted to the electronic apparatus 100 (S1030).

In operation S1020 of recognizing a fingerprint, a user fingerprint may be recognized according to a user command for input of ID and PASSWORD in a character input mode for user account generation.

In operation S1020 of recognizing a fingerprint, the fingerprint may be recognized through a fingerprint scan sensor included in a confirmation button area that receives a user command for receiving a specific text on a character input UI. In this case, in response to the electronic apparatus 100 entering a preset character input mode, the fingerprint scan sensor may be activated. Here, whether the electronic apparatus 100 enters a preset character input mode may be determined based on a signal received from an electronic apparatus.

In operation S1020 of recognizing a fingerprint, the user fingerprint may be recognized by as much as a pressing and manipulating number of times for the confirmation button area, and a plurality of pieces of fingerprint information corresponding to the recognized fingerprint may be transmitted to the electronic apparatus 100.

Figure 11:
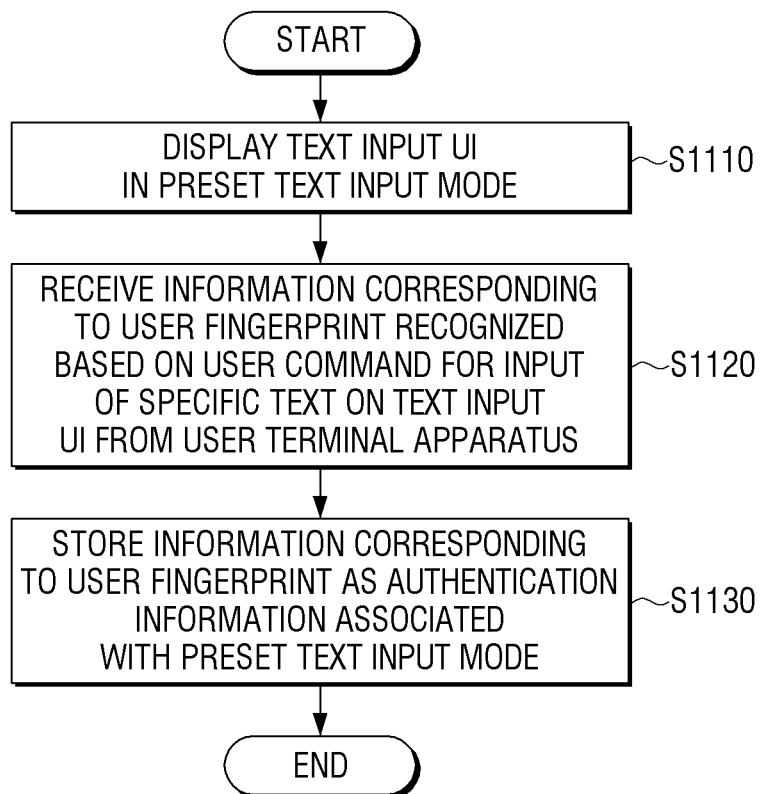
FIG. 11 is a flowchart for explanation of a method of controlling an electronic apparatus according to an embodiment of the present invention.

FIG. 11 is a flowchart for explanation of a method of controlling an electronic apparatus according to an embodiment of the present invention.

In the method of controlling the electronic apparatus controlled by the user terminal apparatus illustrated in FIG. 11, the electronic apparatus 100 displays a character input UI in a preset character input mode (S1110).

Then information corresponding to a recognized user fingerprint is received based on a user command for input of a specific text on a character input UI from the user terminal apparatus 200 (S1120).

Then information corresponding to the user fingerprint is stored as authentication information associated with a preset character input mode (S1130).

Here, the preset character input mode may be a character input mode for user account generation. In this case, in operation S1230 of storing the authentication information, information corresponding to a user fingerprint received from the user terminal apparatus 200 may be stored as authentication information about a user account generated in a character input mode for user account generation.

The information corresponding to the user fingerprint received from the user terminal apparatus 200 is stored as authentication information about a user account, and then the electronic apparatus 100 may perform authentication based on stored information in response to an authentication event for a user account occurring.

Figure 13:
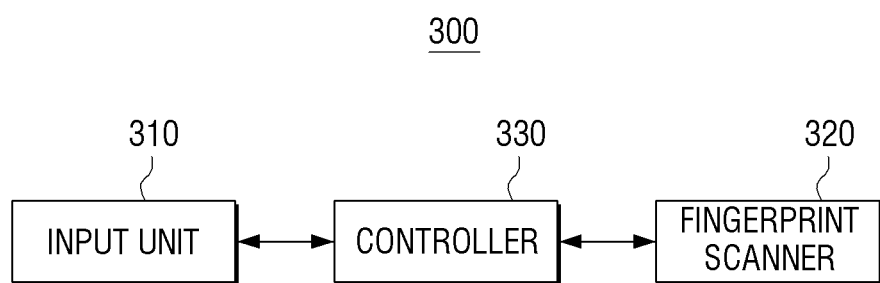
FIG. 13 is a block diagram illustrating a configuration of a user terminal apparatus according to another embodiment of the present invention.

FIG. 13 is a block diagram illustrating a configuration of a user terminal apparatus 300 according to another embodiment of the present invention.

Referring to FIG. 13, the user terminal apparatus 300 includes an input unit 310, a fingerprint scanner 320, and a controller 330. Here, the user terminal apparatus 300 may be embodied as various user terminals such as a cellular phone, a smart phone, a tablet computer, a notebook computer, a terminal for digital broadcast, a personal digital assistant (PDA), a portable multimedia player (PMP), a navigation device, etc. That is, the user terminal apparatus 300 may be embodied as a touch-based portable terminal that displays a UI image and controls the displayed UI image via touch interaction. In this case, the user terminal apparatus 300 may be embodied in the form including a touchscreen. Accordingly, the user terminal apparatus 300 may include a touch sensor and may be embodied to execute a program using a finger or a pen (e.g., a stylus pen). To this end, the user terminal apparatus 300 may be embodied to include a touch sensor or optical joystick (OJ) sensor for receiving various types of user commands.

The input unit 310 may receive various user commands and may be embodied to include the aforementioned touch panel or touchscreen.

In particular, the input unit 310 may receive a password for user authentication in the form of touch. Here, the password may be input in the form of at least one of pattern input and number input.

The fingerprint scanner 320 is included in a preset area of a touch panel unit and recognizes a user fingerprint. Here, the preset area may be an area to which a pattern or a number is input. In particular, in response to a GUI for guiding password input being displayed through a touchscreen, the preset area may be provided in an area in which the corresponding guide is displayed. That is, the preset area may be an area in which a GUI for guiding pattern input is displayed or an area in which each number is displayed in a number input UI, but is not limited thereto. That is, the preset area may be any area as long as the area includes at least the corresponding area.

The controller 330 may perform user authentication based on a password input through a touch panel and compare fingerprint information acquired during password input with a pre-stored fingerprint information to perform additional authentication.

In detail, the controller 330 may perform initial authentication based on an input pattern or number in a pattern recognition mode or a number recognition mode and compare fingerprint information acquired during pattern or number input with pre-stored fingerprint information to perform additional authentication. Here, the pattern recognition mode or the number recognition mode may be a mode for recognition of a pattern or number input in order to release a lock state (or a lock screen) of the user terminal apparatus 300.

The controller 330 may acquire user fingerprint information in at least one of a touch point in which pattern input is begun in a pattern recognition mode, a touch point in which a direction is changed during pattern input, and a touch point in which pattern input is terminated. For example, in response to a pattern "Z" being input, the controller 330 may acquire user fingerprint information in at least one of a first touch point in which pattern input is begun, a second touch point in which a direction is changed to diagonal direction drag from right direction drag, a third touch point in which a direction is changed to left direction drag from diagonal direction drag, and a fourth touch point in which pattern input is terminated. However, the controller 330 may acquire user fingerprint information in at least one touch point (for example, in the case of four-digit password, a touch point in which a first number and a last number are input) in which a number is input in a number recognition mode. However, the present invention is not limited thereto. Needless to say, user fingerprint information may be acquired in all touch points in which a number is input.

In addition, the controller 330 may acquire user fingerprint information based on pattern input for pattern registration in a pattern registration mode for pattern authentication and store the acquired fingerprint information as the pre-stored fingerprint information. Here, the pattern registration mode refers to a mode for initially (e.g., through as a setting menu) registering in order to use pattern input via a user authentication method. Needless to say, the same fact may also be applied to a number registration mode.

When user fingerprint information is not normally acquired in a pattern registration mode, the controller 330 may provide GUI feedback, voice feedback, haptic feedback, etc. for guiding the corresponding fact. That is, the controller 330 may guide the corresponding fact to normally register a fingerprint in order to appropriately recognize the fingerprint in a pattern registration mode when the fingerprint is not normally acquired. For example, the controller 330 may provide guidance for re-requesting a pattern number (number input) due to fingerprint recognition error or guidance for requesting to maintain touch input for a preset time period. However, needless to say, the guidance may be provided in the aforementioned pattern recognition mode. In addition, the same fact may also be applied to a number registration mode or a number recognition mode. Although not illustrated, the user terminal apparatus 300 may further include a display unit (not shown). When the display unit (not shown) is combined with the aforementioned touch panel, the display unit may be embodied in the form of touchscreen. The display unit (not shown) displays a UI image. Here, the UI image may include various content reproducing images such as an image, a moving picture, a text, music, etc., an application execution image including various contents, a web browser image, a graphic user interface (GUI) image, or the like.

In particular, the display unit (not shown) may provide a GUI for guidance of a password in a preset input mode. Here, the preset input mode may include at least one of a password registration mode for authentication and a password recognition mode for authentication. In this case, a password may be input in the form of pattern or number (or text). Accordingly, in response to a password being input in the form of pattern, a GUI (e.g., a UI including 9 points) for guidance of pattern input, and in response to a password being input in the form of number (or text), a GUI (i.e., a number (or a text)) for guidance of number input may be provided.

In addition, the user terminal apparatus 300 may further include a storage unit (not shown) for storing a pattern, a password, a fingerprint, or the like registered for user authentication, a communication unit (not shown), an audio output unit (not shown), etc., which are similar to those of FIG. 3B, and thus a detailed description thereof will be omitted herein.

As described above, according to another embodiment of the present invention, fingerprint authentication (physical authentication) and pattern (or password) authentication (cognitive authentication) may be simultaneously input to provide a simple authentication method with reinforced security.

Figure 12A:
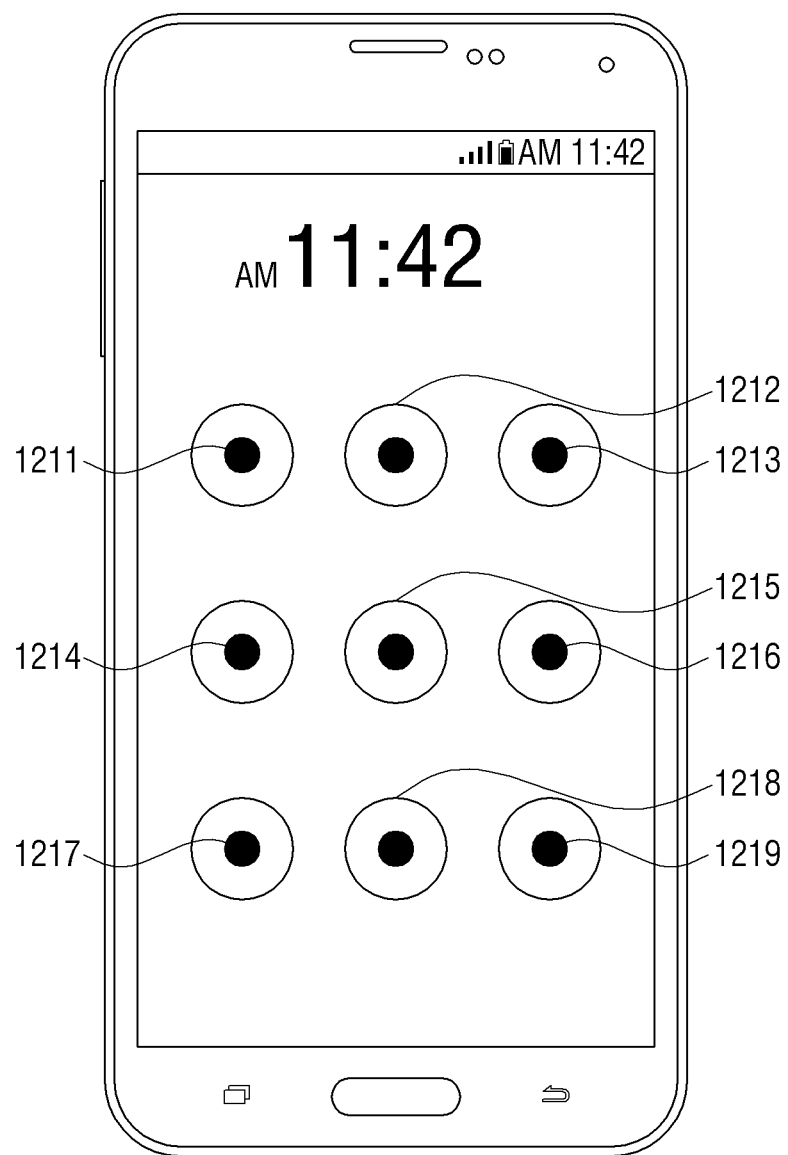
FIGS. 12A and 12B are diagrams for explanation of a method of providing a guide graphic user interface (GUI) according to an embodiment of the present invention.
Figure 12B:
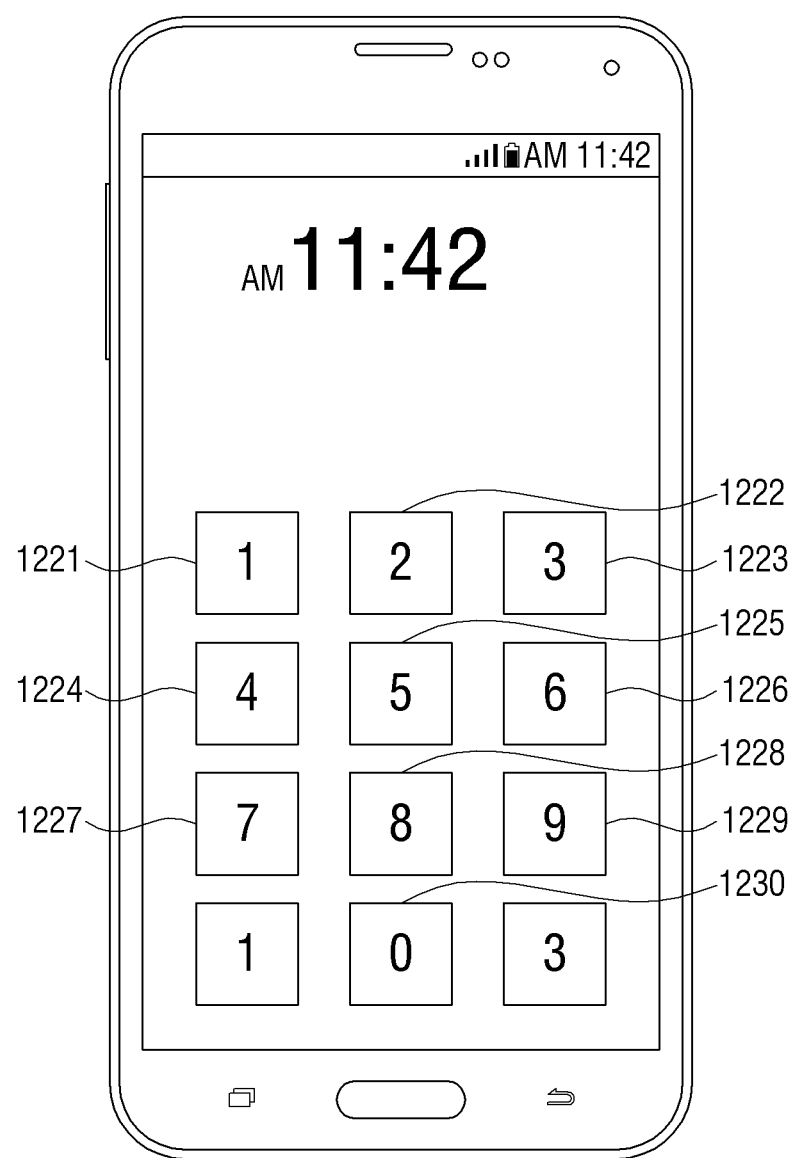

FIGS. 12A and 12B are diagrams for explanation of a method of providing a guide GUI according to an embodiment of the present invention.

FIG. 12A shows a state in which GUIs 1211 to 129 for guidance of pattern input are provided in a pattern authentication mode, and FIG. 12B shows a state in which GUIs 1221 to 1230 for guidance of number input are provided in a number authentication mode.

Although not illustrated in the diagram, a fingerprint sensor may be provided in an area in which the GUIs 1211 to 1219 for guidance of pattern input are displayed or the GUIs 1221 to 1230 for guidance of number input. The fingerprint sensor may be provided on each sub area in which each GUI is displayed or on an entire area including a sub area in which each GUI is displayed.

Figure 14:
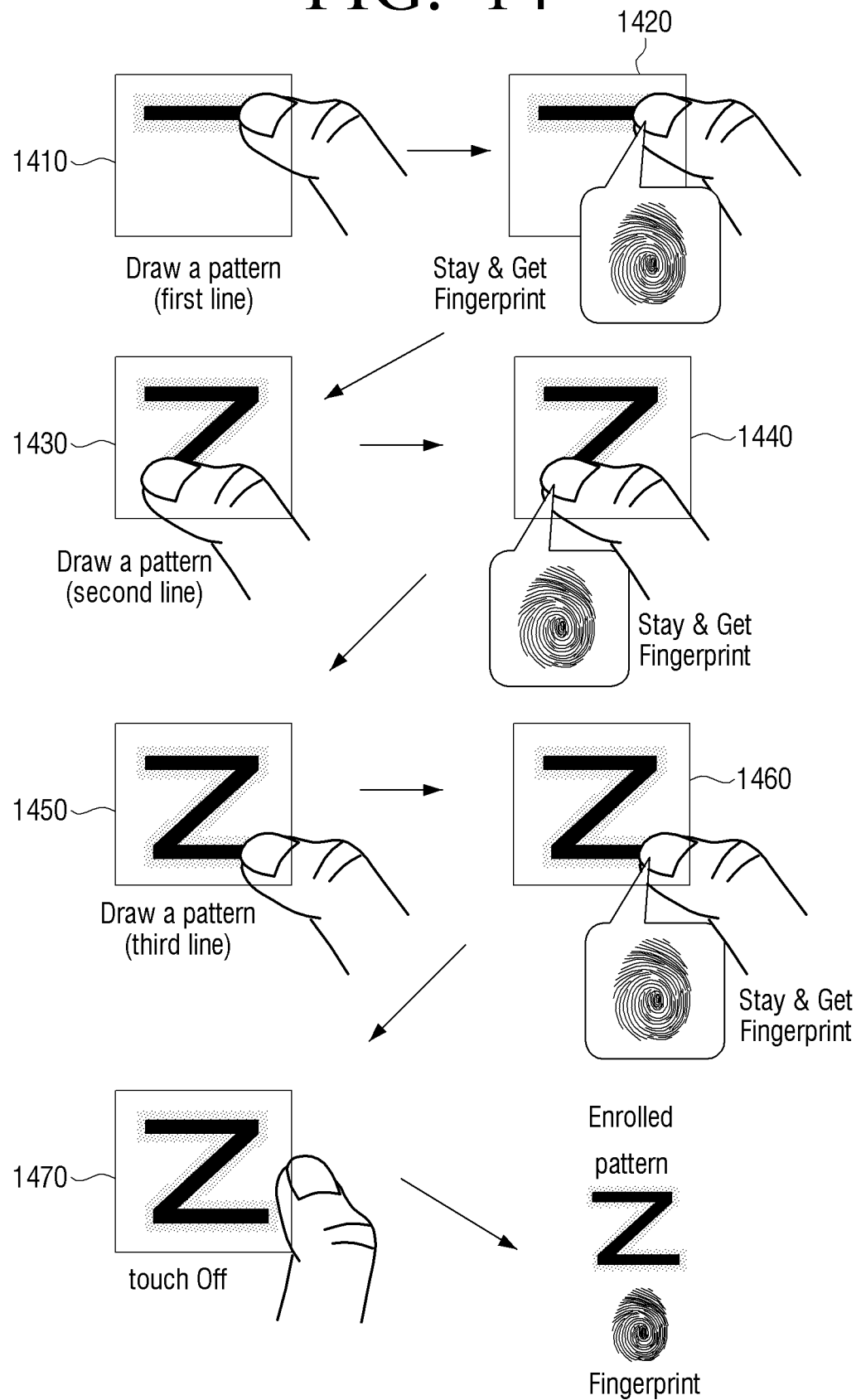
FIG. 14 is a diagram for explanation of a pattern registering method according to another embodiment of the present invention.

FIG. 14 is a diagram for explanation of a pattern registering method according to another embodiment of the present invention.

In FIG. 14, for convenience of description, it is assumed that a pattern with a shape "Z" is registered.

As illustrated in FIG. 14, in response to a first line being input (1410), a fingerprint is acquired at a last touch point of the first line, that is, a touch point in which a direction is changed to a line "/" from a line " " (1420). In this case, a preset touch needs to be maintained at a touch point in which the fingerprint is recognized, and this fact may be provided to a user in various forms such as a notification window, a voice, or the like.

Then in response to a second line being input (1430), a fingerprint may be acquired at a last touch point of the second line, that is, a touch point in which a direction is changed to a line "-" from a line "/" (1440).

Then in response to a last line being input (1450), a fingerprint may be acquired at a touch point of the last line, that is, a touch point in which pattern input is completed (1460).

Then in response to pattern input being completed (1470), a fingerprint input during pattern input may be registered as authentication information together with a pattern "Z" (1480).

However, when a fingerprint is not appropriately recognized, a voice message or a notification window for feeding back this fact may be provided to a user. In addition, when a fingerprint is appropriately recognized, feedback (e.g., GUI feedback, haptic feedback, voice feedback, etc.) may also be provided.

Figure 15:
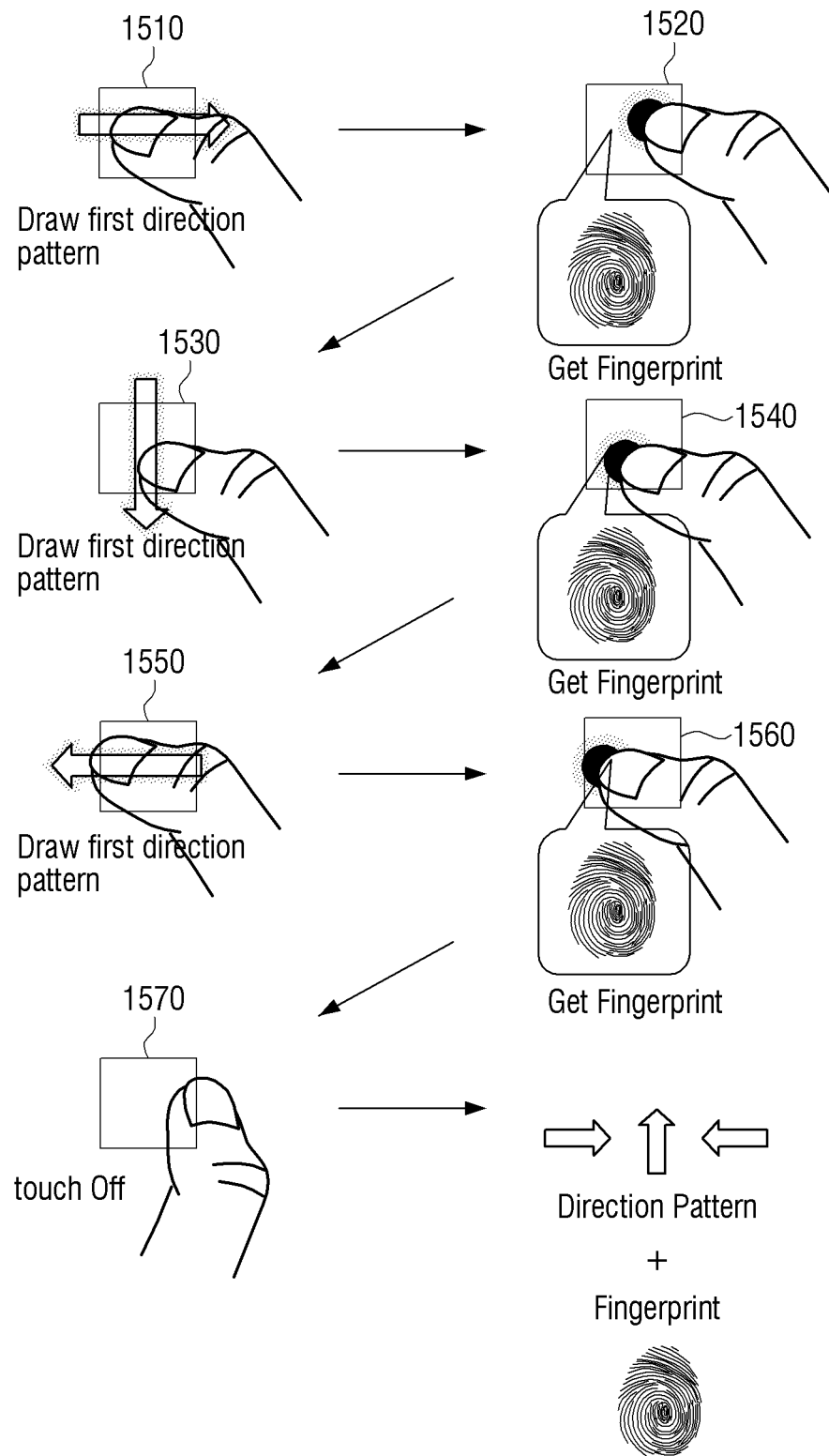
FIG. 15 is a diagram for explanation of a pattern registering method according to another embodiment of the present invention.

FIG. 15 is a diagram for explanation of a pattern registering method according to another embodiment of the present invention.

FIG. 14 shows a pattern registration procedure in a terminal with a wide input area, and FIG. 15 shows a pattern registration procedure in a terminal with a small input area. That is, in a small area, a simple direction pattern instead of text form pattern may be used.

For convenience of description, in FIG. 15, it is assumed that consecutive patterns of directions "→, ↓, and ←" are registered.

As illustrated in FIG. 15, in response to a first direction pattern (→) being input (1510), a fingerprint may be acquired at a last touch point of a first direction pattern (1520).

Then in response to a second direction pattern (↓) being input (1530), a fingerprint may be acquired at a last touch point of a second direction pattern (1540).

Then in response to a last direction pattern (←) being input (1550), a fingerprint may be acquired at a touch point of a last direction pattern (1560).

Then in response to pattern input being completed (1570), a fingerprint recognized during pattern input may be registered as user authentication information together with direction patterns "→, ↓, and ←" (1580).

Figure 16A:
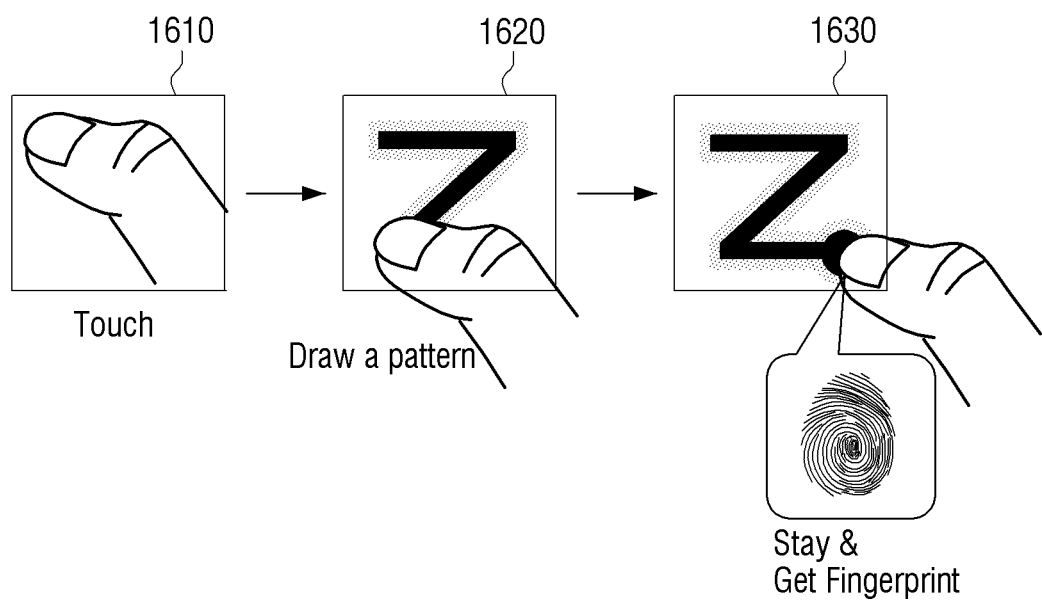
FIGS. 16A and 16B are diagrams for explanation of a pattern authentication method using the pattern registering method described with reference to FIG. 14.
Figure 16B:
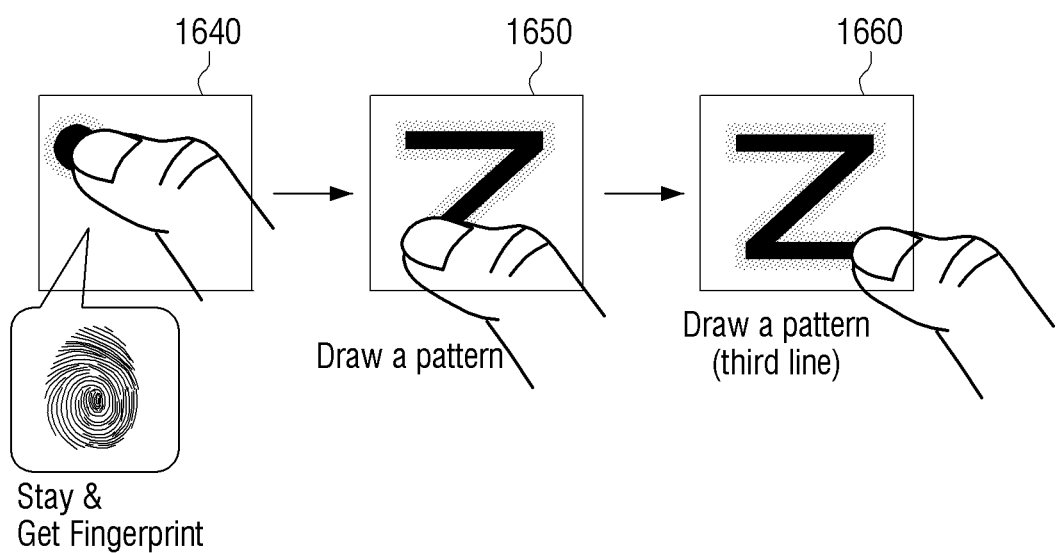

FIGS. 16A and 16B are diagrams for explanation of a pattern authentication method using the pattern registering method described with reference to FIG. 14.

As illustrated in FIG. 16A, in response to a pattern being input for user authentication, a fingerprint may be acquired at a touch point in which pattern input is terminated, and user authentication may be performed through the input pattern and a fingerprint acquired during pattern input.

As illustrated in FIG. 16B, a fingerprint may be acquired at a touch point in which pattern input is begun, and user authentication may be performed through the input pattern and the fingerprint acquired during pattern input.

However, FIGS. 16A and 16B show an embodiment of the present invention. A fingerprint for user authentication may be acquired at both a touch point in which pattern input is begun and a touch point in which pattern input is terminated or acquired at another touch point (a touch point in which a direction is changed).

Figure 17:
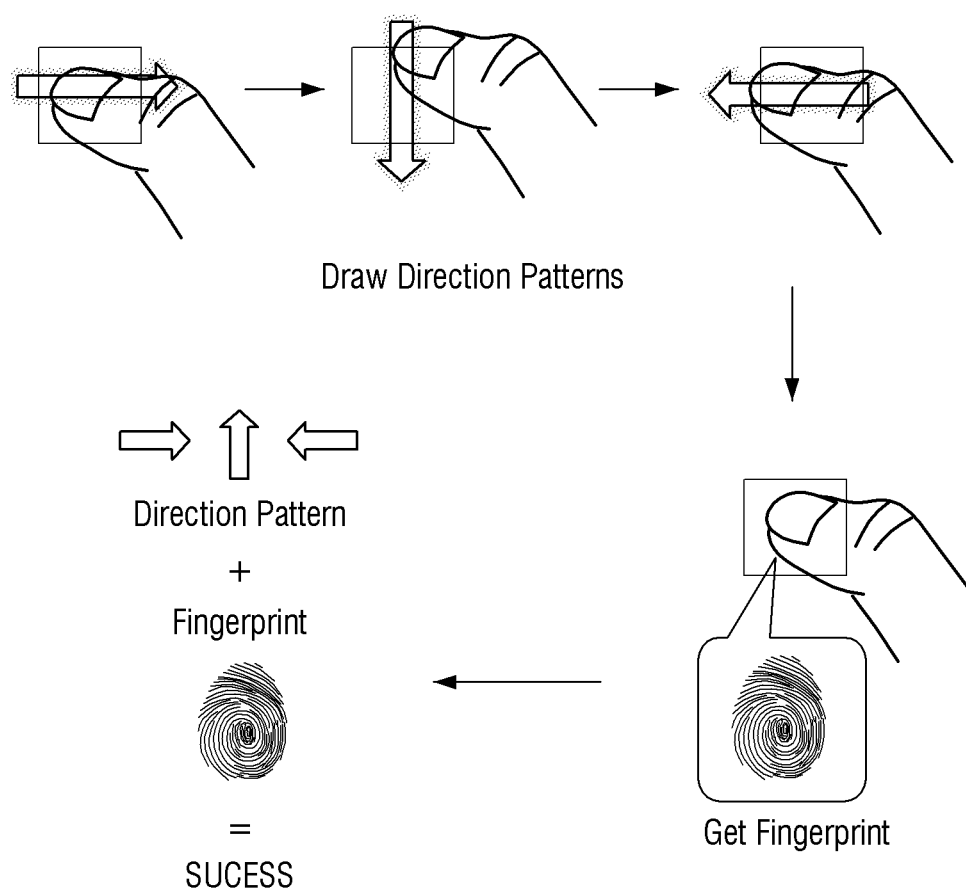
FIG. 17 is a diagram for explanation of a pattern authentication method using the pattern registering method described with reference to FIG. 15.

FIG. 17 is a diagram for explanation of a pattern authentication method using the pattern registering method described with reference to FIG. 15.

As illustrated in FIG. 17, in response to a direction pattern being input for user authentication, input of the direction pattern may be completed, a fingerprint may be acquired via touch input, and then user authentication may be performed through the input direction pattern and the acquired fingerprint. However, this is merely exemplary, and needless to say, a user fingerprint may be simultaneously acquired with direction pattern input.

Figure 18:
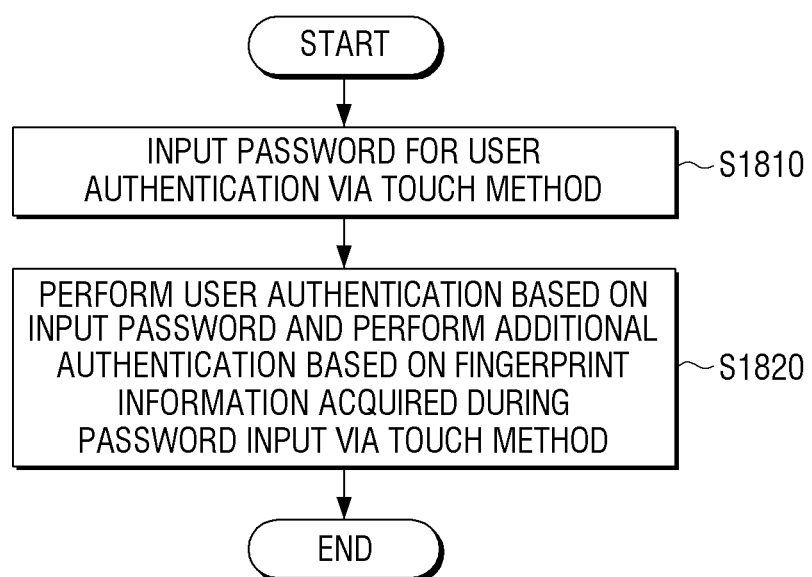
FIG. 18 is a flowchart of a method of controlling a user terminal apparatus according to another embodiment of the present invention.

FIG. 18 is a flowchart of a method of controlling a user terminal apparatus according to another embodiment of the present invention.

According to the method of controlling a user terminal apparatus illustrated in FIG. 18, first, a password for user authentication is input using a touch method (S1810).

Then user authentication is performed based on the input password and additional authentication is performed based on fingerprint information acquired while the password is input using the touch method (S1820).

Here, a password authentication method may include at least one of a pattern authentication method and a number authentication method.

The controlling method may further include displaying a guide GUI for guidance of password input, and a fingerprint sensor for fingerprint scan may be provided in an area in which the guide GUI is displayed.

When the password authentication method is a pattern authentication method, in operation S1820, user fingerprint information may be acquired in at least one of a touch point in which pattern input is begun, a touch point in which a direction is changed during pattern input, and a touch point in which pattern input is terminated.

In addition, when the password authentication method is a pattern authentication method, the controlling method may further include acquiring user fingerprint information based on pattern input for pattern registration in a pattern registration mode for pattern authentication and storing the acquired fingerprint information as reference fingerprint information for fingerprint authentication.

In addition, when user fingerprint information is not normally acquired in a pattern registration mode, a UI for guidance of the corresponding fact may be provided.

According to the aforementioned various embodiments of the present invention, fingerprint registration is automatically performed by naturally connecting an ID and a fingerprint during text input for ID/PW required for account generation or pattern (or number) input through pattern authentication (or number authentication), and thus a separate procedure for fingerprint registration does not have to be performed. Accordingly, a simple user authentication method with reinforced security may be provided.

The electronic apparatus and the user terminal apparatus according to the aforementioned various embodiments of the present invention may be embodied as a program and the program may be provided to the electronic apparatus.

In detail, in response to the electronic apparatus entering a preset character input mode, there may be provided a non-transitory computer readable medium for storing a program including recognizing a user fingerprint according to a user command for input of a specific text on a character input UI, and transmitting information corresponding to the recognized user fingerprint to the electronic apparatus.

Here, the non-transitory computer readable media refers to a medium that semipermanently stores data and is readable by a device instead of a medium that stores data for a short time period, such as a register, a cache, a memory, etc. In detail, the aforementioned programs may be stored and provided in the non-transitory computer readable media such as CD, DVD, hard disc, blue ray disc, USB, a memory card, ROM, etc.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic apparatus comprising:
    a communicator;
    a fingerprint scanner; and
    a processor configured to:
        receive, through the communicator, a first signal corresponding to a request for authentication of a user associated with a user account, the request being initiated in response to an input in connection with a user interface (UI) displayed on an external display apparatus,
        activate the fingerprint scanner based on the first signal,
        obtain fingerprint information of the user through the fingerprint scanner,
        perform an authentication of the user associated with the user account based on the obtained fingerprint information, and
        output a second signal based on authentication of the user for accessing the user account displayed on the external display apparatus.

2. The electronic apparatus of claim 1, wherein the UI displayed on the external display apparatus is configured to receive information corresponding to the user account.

3. The electronic apparatus of claim 1, wherein the processor is configured to receive the first signal in response to the request for authentication of the user associated with the user account included in the UI being initiated on the external display apparatus.

4. The electronic apparatus of claim 1, wherein the processor is configured to, based on the authentication of the user being performed, deactivate the fingerprint scanner.

5. The electronic apparatus of claim 1, further comprising:
    a display,
    wherein the processor is configured to, based on the request being received through the communicator, control the display to display a first UI for authentication of the user by using the electronic apparatus, and based on a user command being input to the first UI for authentication of the user displayed in the display, activate the fingerprint scanner.

6. The electronic apparatus of claim 5, wherein the processor is configured to, based on the user command being input to the first UI for authentication of the user displayed in the display, control the display to display a second UI guiding an input of the fingerprint information of the user.

7. The electronic apparatus of claim 1, further comprising:
    an input unit,
    wherein the processor is configured to, based on a user command to activate the fingerprint scanner being input to the input unit, activate the fingerprint scanner.

8. The electronic apparatus of claim 1, further comprising:
    a touch screen,
    wherein the fingerprint scanner is provided in an area of the electronic apparatus different from an area of the touch screen in the electronic apparatus.

9. An authentication method using an electronic apparatus, the authentication method comprising:
    receiving a first signal corresponding to a request for authentication of a user associated with a user account, the request being initiated in response to an input received in connection with a user interface (UI) displayed on an external display apparatus,
    activating a fingerprint scanner of the electronic apparatus based on the first signal,
    obtaining a fingerprint information through the fingerprint scanner,
    perform an authentication of the user associated with the user account based on the obtained fingerprint information, and
    outputting a second signal based on authentication of the user for accessing the user account displayed on the external display apparatus.

10. The authentication method of claim 9, wherein the UI displayed on the external display apparatus is configured to receive information corresponding to the user account.

11. The authentication method of claim 9, wherein the first signal is received in response to the request for authentication of the user associated with the user account included in the UI being initiated on the external display apparatus.

12. The authentication method of claim 9, further comprising:
    based on the authentication for the user being performed, deactivating the fingerprint scanner.

13. The authentication method of claim 9, further comprising:
    based on the request being received, displaying a first UI for authentication for the user by using the electronic apparatus, and
    based on a user command being input to the first UI for authentication of the user displayed on the electronic apparatus, activating the fingerprint scanner.

14. The authentication method of claim 13, further comprising:
    based on the user command being input to the first UI for authentication of the user displayed on the electronic apparatus, displaying a second UI guiding an input of the fingerprint information of the user.

15. The authentication method of claim 9, further comprising:
    based on a user command to activate the fingerprint scanner being input to the electronic apparatus, activating the fingerprint scanner.

16. The authentication method of claim 9, wherein the electronic apparatus further comprises a touch screen, and
    wherein the fingerprint scanner is provided in an area of the electronic apparatus different an area of the touch screen in the electronic apparatus.

17. An authentication system comprising:
a display apparatus configured to display a first user interface (UI) to receive input of a user account; and
an electronic apparatus comprising a fingerprint scanner for authentication of a user associated with the user account input to the first UI,
wherein the electronic apparatus is configured to:
receive a first signal corresponding to a request for authentication of the user associated with the user account, the request being initiated in response to an input received in connection with the first UI displayed on an external display apparatus,
activate the fingerprint scanner based on the first signal,
obtain fingerprint information through the fingerprint scanner,
perform an authentication of the user associated with the user account based on the obtained fingerprint information, and
output a second signal based on authentication of the user for accessing the user account displayed on the display apparatus.

18. The authentication system of claim 17, wherein the electronic apparatus is configured to receive the first signal in response to the request for authentication of the user associated with the user account input to the first UI being initiated on the display apparatus.

19. The authentication system of claim 17, wherein the display apparatus is configured to display a second UI to request the authentication of the user account by using the electronic apparatus.

20. The authentication system of claim 17, wherein the electronic apparatus is configured to, based on the authentication of the user being performed, deactivate the fingerprint scanner.

21. The authentication system of claim 20, wherein the authentication of the user account is performed by an external apparatus based on the fingerprint information obtained by the electronic apparatus.

22. A non-transitory computer-readable medium recording instructions for executing by a processor of an electronic apparatus to cause the electronic apparatus to perform operations comprising:
receiving a first signal corresponding to a request for authentication of a user associated with a user account, the request being initiated in response to an input received in connection with a user interface (UI) displayed on an external display apparatus,
activating a fingerprint scanner of the electronic apparatus based on the first signal,
obtaining a fingerprint information through the fingerprint scanner,
authenticating the user associated with the user account based on the obtained fingerprint information, and
outputting a second signal based on authentication of the user for accessing the user account displayed on the external display apparatus.

23. The non-transitory computer-readable medium of claim 22, wherein the UI displayed on the external display apparatus is configured to receive information corresponding to the user account.

24. The non-transitory computer-readable medium of claim 22, wherein the first signal is received in response to the request for authentication of the user associated with the user account included in the UI being initiated on the external display apparatus.

25. The non-transitory computer-readable medium of claim 22, wherein the operations further comprise, based on the authentication for the user being performed, deactivating the fingerprint scanner.

26. The non-transitory computer-readable medium of claim 22, wherein the operations further comprise:
based on the first signal being received, displaying a first UI for authentication for the user by using the electronic apparatus, and
based on a user command being input to the first UI for authentication of the user displayed on the electronic apparatus, activating the fingerprint scanner.

27. The non-transitory computer-readable medium of claim 26, wherein the operations further comprise, based on the user command being input to the first UI for authentication of the user displayed on the electronic apparatus, displaying a second UI guiding an input of the fingerprint information of the user.

28. The non-transitory computer-readable medium of claim 22, wherein the operations further comprise, based on a user command to activate the fingerprint scanner being input to the electronic apparatus, activating the fingerprint scanner.

29. The non-transitory computer-readable medium of claim 22, wherein the electronic apparatus further comprises a touch screen, and
wherein the fingerprint scanner is provided in an area of the electronic apparatus different an area of the touch screen in the electronic apparatus.

* * * * *